US012761756B2

(12) United States Patent
Yun et al.

(10) Patent No.: US 12,761,756 B2
(45) Date of Patent: Oct. 13, 2026

(54) TOUCH SENSING DISPLAY APPARATUS AND DRIVING METHOD THEREOF

(71) Applicant: LG Display Co., Ltd., Seoul (KR)

(72) Inventors: Seong Ho Yun, Paju-si (KR); Hoon Choi, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/950,709

(22) Filed: Nov. 18, 2024

(65) Prior Publication Data

US 2025/0224838 A1 Jul. 10, 2025

(30) Foreign Application Priority Data

Jan. 9, 2024 (KR) ........................ 10-2024-0003376

(51) Int. Cl.
*G06F 3/041* (2006.01)

(52) U.S. Cl.
CPC ........ *G06F 3/04184* (2019.05); *G06F 3/0412* (2013.01)

(58) Field of Classification Search
None
See application file for complete search history.

(56) References Cited

U.S. PATENT DOCUMENTS 11,809,652 B2 * 11/2023 Hwang .................. H10K 59/40
2006/0132463 A1 * 6/2006 Lee ....................... G06F 3/0412
345/173

FOREIGN PATENT DOCUMENTS

KR 20130117215 A 10/2013

* cited by examiner

*Primary Examiner* — Brian M Butcher
(74) *Attorney, Agent, or Firm* — Seed Intellectual Property Law Group LLP

(57) ABSTRACT

A touch sensing display device includes a display panel configured to alternately perform display driving and touch sensing driving and a gate driving circuit including stage circuits for driving gate lines of the display panel, wherein the gate driving circuit outputs a display scan signal generated based on a display carry clock to the display panel during a display frame defining a display driving period and outputs a touch scan signal generated based on a touch carry clock to the display panel during a touch frame defining a touch sensing driving period, and a position at which the touch carry clock is generated during a first touch sensing frame included in the touch sensing driving period differs from a position at which the touch carry clock is generated during a second touch sensing frame included in the touch sensing driving period.

20 Claims, 19 Drawing Sheets

TOUCH SENSING DISPLAY APPARATUS AND DRIVING METHOD THEREOF

CROSS-REFERENCE TO RELATED APPLICATIONS

This application claims the benefit of the Korean Patent Application No. 10-2024-0003376 filed on Jan. 9, 2024, which is hereby incorporated by reference as if fully set forth herein.

BACKGROUND

Technical Field

The present disclosure relates to a touch sensing display device and a driving method thereof.

Description of the Related Art

As information technology advances, the market for display devices which are a connection medium between a user and information is growing. Therefore, the use of display devices such as light emitting display devices, quantum dot display (QDD) devices, and liquid crystal display (LCD) devices is increasing.

The display devices described above include a display panel which includes a plurality of subpixels, a driver which outputs a driving signal for driving the display panel, and a power supply which generates power which is to be supplied to the display panel or the driver.

In such display devices, when the driving signal (for example, a scan signal and a data signal) is supplied to each of the subpixels provided in the display panel, a selected subpixel may transmit light or may self-emit light, and thus, an image may be displayed.

BRIEF SUMMARY

The present disclosure may decrease a carry signal transfer time to secure a touch sensing time, and based thereon, may enhance sensitivity based on a touch sensing operation, may increase an obtainment target (a touch screen block) of touch data, and may secure a time for analyzing coordinates of a touch input position.

As embodied and broadly described herein, a touch sensing display device includes: a display panel configured to alternately perform display driving and touch sensing driving; and a gate driving circuit including stage circuits for driving gate lines of the display panel, wherein the gate driving circuit outputs a display scan signal generated based on a display carry clock to the display panel during a display frame defining a display driving period and outputs a touch scan signal generated based on a touch carry clock to the display panel during a touch frame defining a touch sensing driving period, and a position at which the touch carry clock is generated during a first touch sensing frame included in the touch sensing driving period differs from a position at which the touch carry clock is generated during a second touch sensing frame included in the touch sensing driving period.

The touch carry clock may move in a forward direction with respect to the display panel during the first touch sensing frame and may move in a reverse direction with respect to the display panel during the second touch sensing frame.

The gate driving circuit may apply a forward voltage for driving the stage circuits in the forward direction during the first touch sensing frame and may apply a reverse voltage for driving the stage circuits in the reverse direction during the second touch sensing frame.

The touch carry clock may be generated from a first gate line of the display panel and may move up to a gate line disposed in a center region of the display panel during the first touch sensing frame, and during the second touch sensing frame, the touch carry clock may be generated from a last gate line of the display panel and may move up to the gate line disposed in the center region of the display panel.

During the touch sensing driving period, a first stage of the stage circuits may supply a first touch scan signal to one first gate line included in a first touch screen block of the display panel, and a second stage of the stage circuits may supply a second touch scan signal to one second gate line included in a second touch screen block of the display panel.

The touch sensing display device may further include a sensing circuit configured to sense a voltage of a source node of a representative pixel formed in a substrate of the display panel according to the touch scan signal, so as to sense a touch input applied to the display panel during the touch sensing driving period.

The representative pixel may include a driving transistor including a source electrode connected to the source node and a gate electrode connected to a gate node, the gate node may include a first conductive pattern which faces the source node with at least one insulation layer therebetween and is one electrode of a storage capacitor and a second conductive pattern connected to the first conductive pattern through a contact hole passing through the at least one insulation layer, the source node may include a third conductive pattern which is disposed on the at least one insulation layer and is the other electrode of the storage capacitor, and the first conductive pattern may be disposed closer to the substrate than the second conductive pattern and the third conductive pattern.

In another aspect of the present disclosure, a driving method of a touch sensing display device, including a display panel alternately performing display driving and touch sensing driving and a gate driving circuit including stage circuits for driving gate lines of the display panel, includes: outputting a display scan signal generated based on a display carry clock to the display panel during a display frame defining a display driving period; and outputting a touch scan signal generated based on a touch carry clock to the display panel during a touch frame defining a touch sensing driving period, wherein a position at which the touch carry clock is generated during a first touch sensing frame included in the touch sensing driving period differs from a position at which the touch carry clock is generated during a second touch sensing frame included in the touch sensing driving period.

The touch carry clock may move in a forward direction with respect to the display panel during the first touch sensing frame and may move in a reverse direction with respect to the display panel during the second touch sensing frame.

The touch carry clock may be generated from a first gate line of the display panel and may move up to a gate line disposed in a center region of the display panel during the first touch sensing frame, and during the second touch sensing frame, the touch carry clock may be generated from a last gate line of the display panel and may move up to the gate line disposed in the center region of the display panel.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

A display device according to the present disclosure may be applied to televisions (TVs), video players, personal computers (PCs), home theaters, electronic devices for vehicles, and smartphones, but is not limited thereto. The display device according to the present disclosure may be implemented as a light emitting display device, a quantum dot display (QDD) device, or a liquid crystal display (LCD) device. Hereinafter, for convenience of description, a light emitting display device self-emitting light by using an inorganic light emitting diode or an organic light emitting diode will be described for example.

In the following description, a scan signal (or a gate signal) applied to pixels may swing between a gate on voltage and a gate off voltage. The gate on voltage may be set to a voltage which is higher than a threshold voltage of a transistor, and the gate off voltage may be set to a voltage which is lower than the threshold voltage of the transistor. The transistor may be turned on in response to the gate on voltage and may be turned off in response to the gate off voltage. In N-channel transistors, the gate on voltage may be a gate high voltage (VGH), and the gate off voltage may be a gate low voltage (VGL). In P-channel transistors, the gate on voltage may be the gate low voltage (VGL), and the gate off voltage may be the gate high voltage (VGH).

Figure 1:
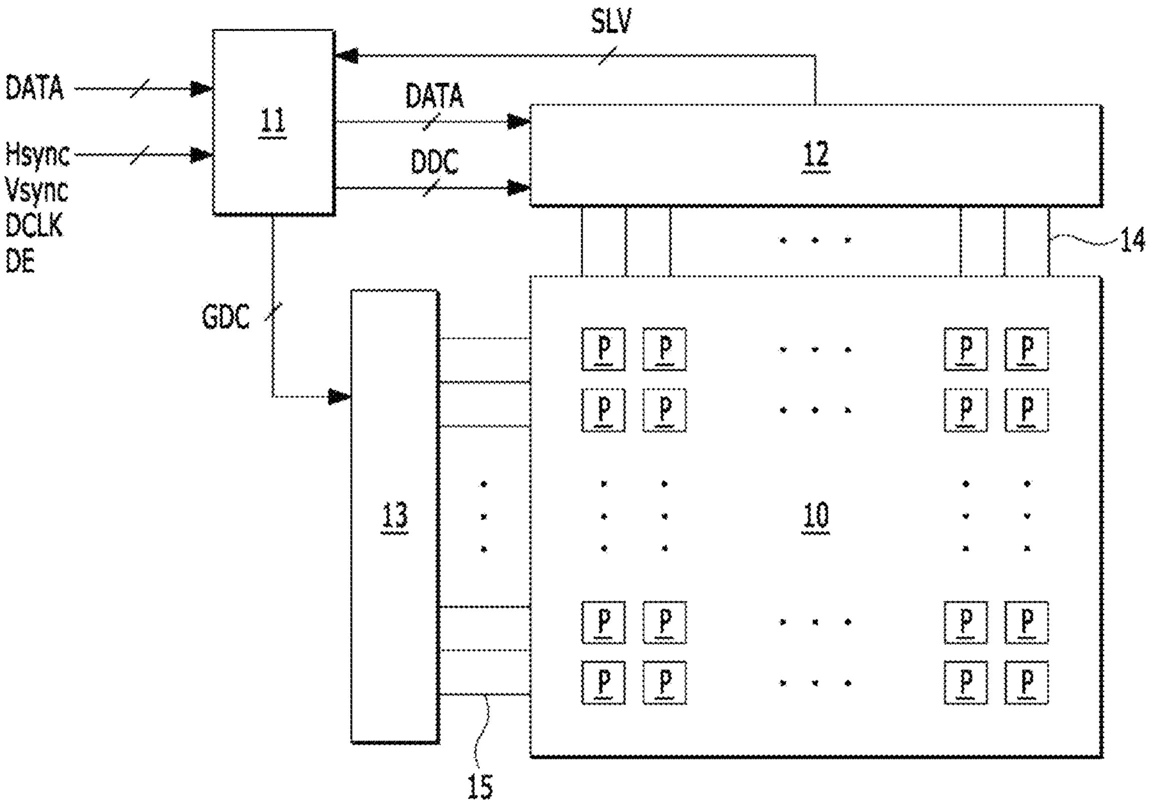
FIG. 1 is a block diagram illustrating a touch sensing display device according to an embodiment.
Figure 2:
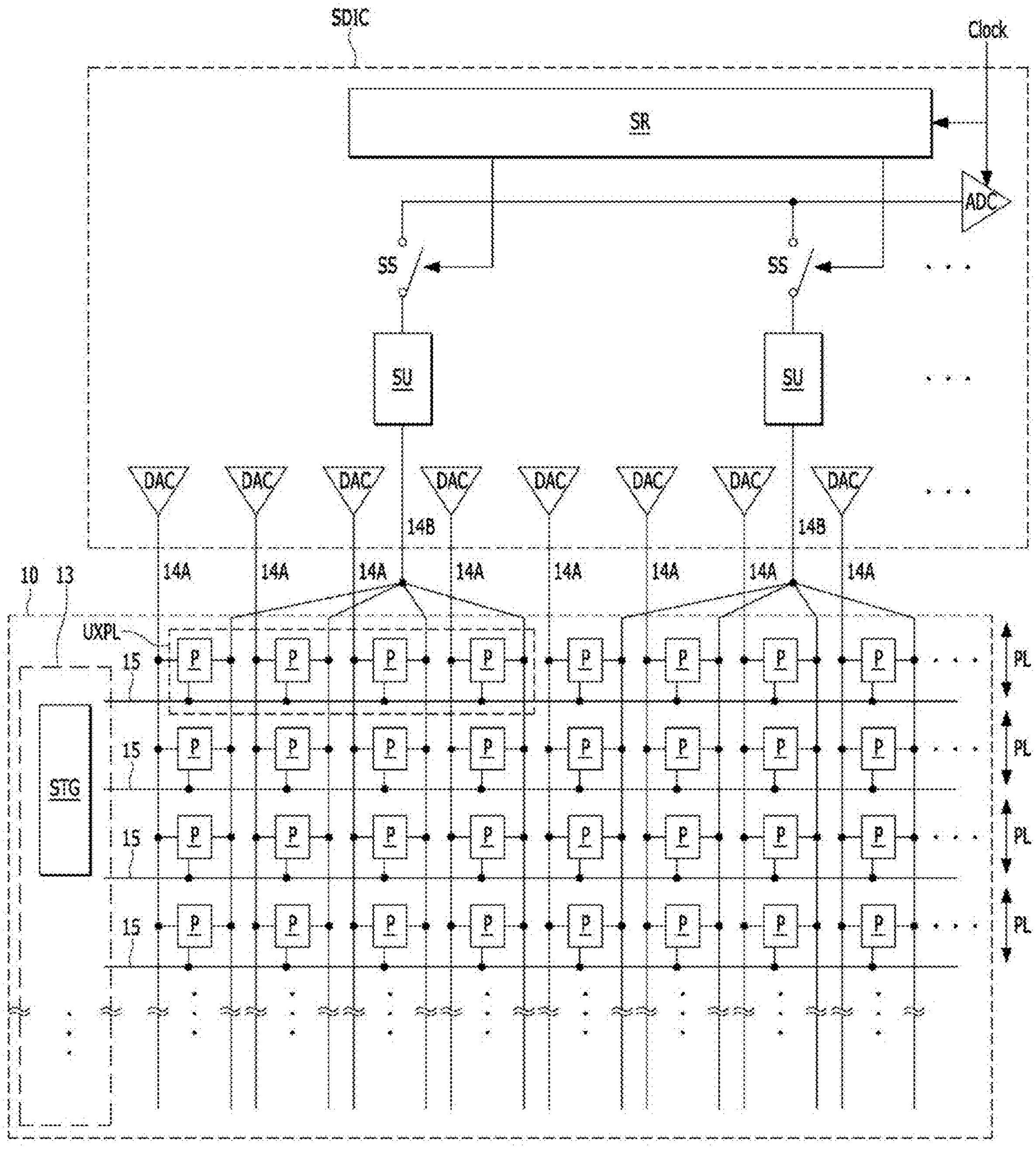
FIG. 2 is a diagram illustrating a configuration of a pixel array and a source driver integrated circuit (IC)

FIG. 1 is a block diagram illustrating a touch sensing display device according to an embodiment, FIG. 2 is a diagram illustrating a configuration of a pixel array and a source driver integrated circuit (IC).

As illustrated in FIGS. 1 and 2, the touch sensing display device according to an embodiment may include a display panel 10, a timing controller 11, a data driving circuit 12, a gate driving circuit 13, and a sensing circuit SU. The sensing circuit SU may be embedded in the data driving circuit 12, but an embodiment is not limited thereto.

In a screen displaying an input image in the display panel 10, first signal lines 14 extending in a column direction (or a vertical direction) may intersect with second signal lines 15 extending in a row direction (or a horizontal direction), and a plurality of pixels P may be respectively provided in a plurality of intersection areas and may be arranged as a matrix type to configure a pixel array. The first signal lines 14 may include a plurality of data lines 14A through which data voltages are supplied and a plurality of reference voltage lines 14B through which a reference voltage is supplied. The reference voltage lines 14B may connect the pixels P with the sensing circuit SU and may be referred to as a sensing line. The second signal lines 15 may be gate lines through which scan signals are supplied.

The pixel array may include a plurality of pixel set lines PL. Here, the pixel set line PL may not denote a physical signal line but may be defined as a pixel set of pixels of one line arranged adjacent to one another in a horizontal direction or defined as a pixel block of pixels of one line. The pixels P may be grouped into a plurality of groups and may implement various colors. When a pixel group for implementing colors is defined as a unit pixel UPXL, one unit pixel UPXL may include red (R), green (G), blue (B), and white (W) pixels. The pixels configuring the one unit pixel UPXL may be arranged adjacent to one another in a horizontal direction and may be designed to share the same reference voltage line 14B, and thus, the pixel array may be simplified.

The timing controller 11 may convert a non-touch driving mode into a touch driving mode or a driving mode opposite thereto, based on whether there is a touch input, mode selection information about a user, and distance information between a display device and a user. The non-touch driving mode may be a driving mode for performing a display operation and an external compensation operation. The touch driving mode may be a driving mode for further performing a touch sensing operation in addition to a display operation and an external compensation operation.

In the non-touch driving mode, all frames may be display frames for display driving. On the other hand, in the touch driving mode, a display frame for display driving and a touch frame for touch sensing driving may be alternately performed at a period of a certain time. Here, the certain time may be a one-frame time, and in this case, one display frame may be arranged between adjacent touch frames. However, the inventive concept is not limited thereto. The certain time may be a several-frame time, and in this case, a plurality of display frames may be arranged between adjacent touch frames.

One frame may include a vertical active period where new image data DATA is scanned (or refreshed or updated) and a vertical blank period where scanning of the image data DATA is not performed. Display driving may be performed in a vertical active period of a display frame, and touch sensing driving may be performed in a vertical active period of a touch frame. External compensation driving may be performed in a vertical blank period of each of the display frame and the touch frame. The external compensation driving may be for sensing a device characteristic value (a threshold voltage and electron mobility of a driving transistor and a threshold voltage of a light emitting device) of a pixel P.

The timing controller 11 may correct digital video data input from a host system by using a compensation value based on a pixel sensing value based on external compensation driving, and then, may supply corrected image data DATA to the data driving circuit 12. The timing controller 11 may receive a timing signal such as a vertical synchronization signal Vsync, a horizontal synchronization signal Hsync, a data enable signal DE, and a dot clock DCLK from the host system to generate a gate timing control signal GDC for controlling an operation timing of the gate driving circuit 13 and a data timing control signal DDC for controlling an operation timing of the data driving circuit 12.

The timing controller 11 may compare a predetermined reference value with a touch sensing value based on a touch sensing operation to obtain coordinate information about a touch input position and may transfer the coordinate information to the host system. The host system may execute a touch application corresponding to the coordinate information.

The data driving circuit 12 may include one or more source driving ICs SDIC. Each of the source driving ICs SDIC may include a latch array, a plurality of digital-to-analog converters DAC respectively connected to the data lines 14A, a plurality of sensing circuits SU respectively connected to the sensing lines 14B, a plurality of multiplex switches SS which selectively connect the sensing circuits SU to a plurality of analog-to-digital converters ADC, and a shift register SR which sequentially turns on the multiplex switches SS.

The latch array may latch the corrected image data DATA input from the timing controller 11, based on the data control signal DDC, and may supply the latched image data DATA to the digital-to-analog converters DAC. The digital-to-analog converters DAC may convert the latched image data DATA into display data voltages and may supply the display data voltages to the data lines 14A. In external compensation driving, the digital-to-analog converters DAC may generate a predetermined external sensing data voltage and may supply the external sensing data voltage to the data lines 14A. In touch sensing driving, the digital-to-analog converters DAC may generate a predetermined touch driving data voltage and may supply the touch driving data voltage to the data lines 14A.

The sensing circuit SU may be used in common in external compensation driving and touch sensing driving, and thus, a separate touch sensing circuit for touch sensing may be removed. Because touch sensing is possible without the separate touch sensing circuit, the source driving IC may be simplified, and thus, power consumption and the manufacturing cost may be reduced.

The sensing circuit SU may supply a reference voltage Vpre to the sensing line 14B, based on the data control signal DDC, or may sample a touch sensing value or a device characteristic sensing value input through the sensing line 14B and may supply a sampled touch sensing value or device characteristic sensing value to the analog-to-digital converter ADC.

The analog-to-digital converter ADC may convert the touch sensing value or the device characteristic sensing value, input from the sensing circuits SU, into a digital sensing signal SLV and may transfer the digital sensing signal SLV to the timing controller 11.

The gate driving circuit 13 may generate a scan signal (SCAN of FIG. 3) suitable for display driving, external compensation driving, and touch sensing driving, based on the gate control signal GDC, and then, may supply the scan signal SCAN to the gate lines 15. The scan signal may include a display scan signal for display driving, an external sensing scan signal for external compensation driving, and a touch scan signal for touch sensing driving. An on period of the display scan signal may correspond to a supply timing of a display data voltage. An on period of the external sensing scan signal may correspond to a supply timing of an external sensing data voltage. An on period of the touch scan signal may correspond to a supply timing of a touch driving data voltage.

The gate control signal GDC may include a plurality of scan clocks and a plurality of carry clocks. An on pulse width of the carry clock may be designed narrower in touch sensing driving than display driving, and thus, a transfer time of a carry signal may be shortened in a touch frame. A time capable of being allocated for an output of a touch scan signal in a touch frame may increase in proportion to a reduction in transfer time of the carry signal, and thus, touch performance may be enhanced.

Figure 3:
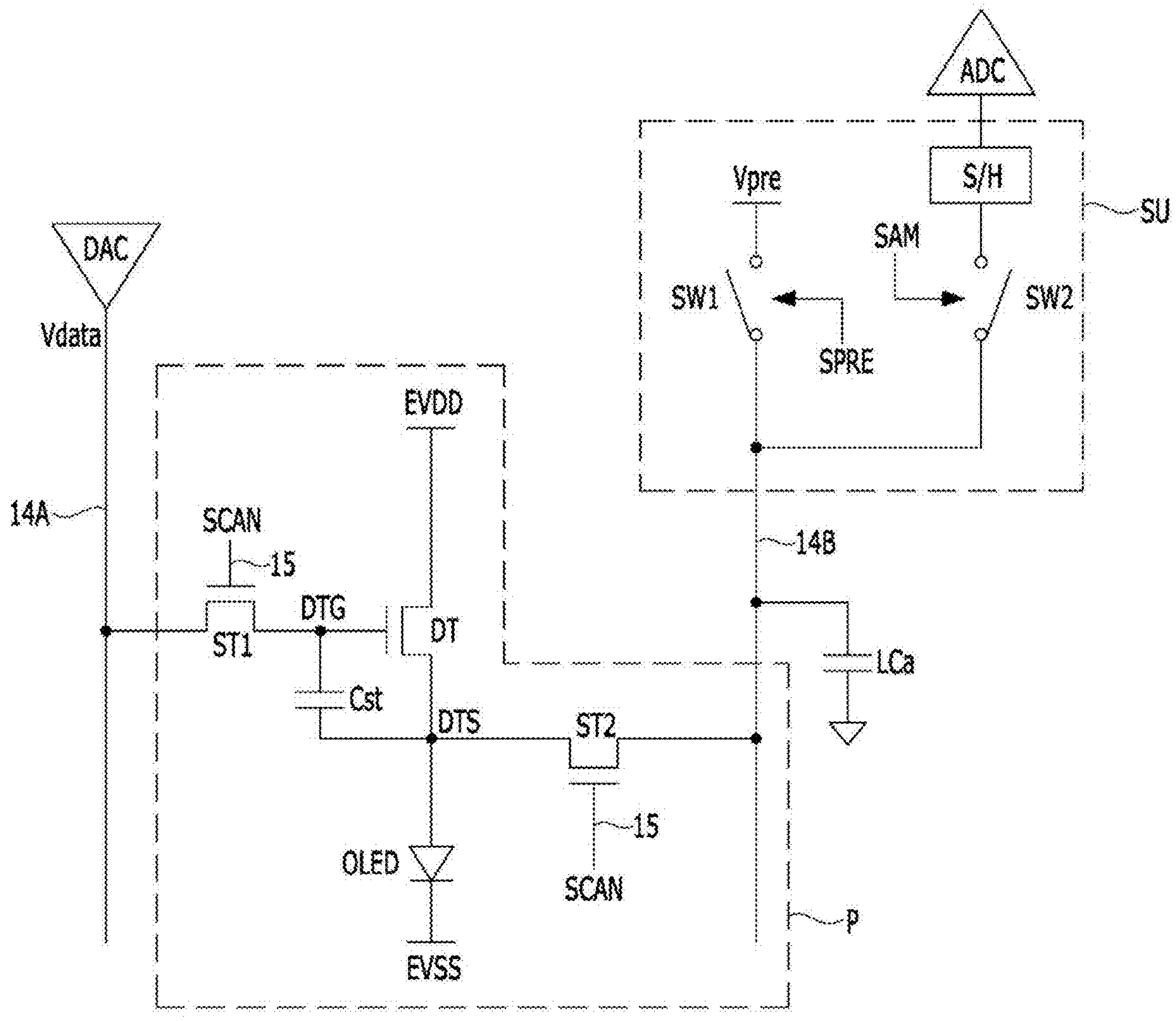
FIG. 3 is a diagram illustrating a configuration of a pixel and a sensing circuit.

FIG. 3 is a diagram illustrating a configuration of a pixel P and a sensing circuit SU.

As illustrated in FIG. 3, the pixel P may be implemented in a structure capable of an external compensation operation and a touch sensing operation. The pixel P may include a light emitting device OLED, a driving transistor DT, a storage capacitor Cst, a first switch transistor ST1, and a second switch transistor ST2. The transistors DT, ST1, and ST2 may each be implemented as a thin film transistor (TFT). TFTs may be implemented as a P type, an N type, or a hybrid type where the P type and the N type are provided in common. Also, a semiconductor layer of a TFT may include amorphous silicon, polysilicon, or oxide.

The light emitting device OLED may include an anode electrode connected to a source node DTS, a cathode electrode connected to an input terminal of a low level driving voltage EVSS, and an organic compound layer disposed between the anode electrode and the cathode electrode. The organic compound layer may include a hole injection layer (HIL), a hole transport layer (HTL), an emission layer (EML), an electron transport layer (ETL), and an electron injection layer (EIL).

The driving transistor DT may control a level of a drain-source current (hereinafter referred to as Ids) of the driving transistor DT input to the light emitting device OLED, based on a gate-source voltage (hereinafter referred to as Vgs) thereof. The driving transistor DT may include a gate electrode connected with a gate node DTG, a drain electrode connected with an input terminal of a high level driving voltage EVDD, and a source electrode connected with a source node DTS.

The storage capacitor Cst may be connected between the gate node DTG and the source node DTS and may hold the gate-source voltage of the driving transistor DT during a predetermined period.

The first switch transistor ST1 may electrically connect a data line 14A with the gate node DTG, based on a scan signal SCAN from a gate line 15, and may allow a data voltage Vdata to be charged into the gate node DTG. The first switch transistor ST1 may include a gate electrode connected with the gate line 15, a drain electrode connected with the data line 14A, and a source electrode connected with the gate node DTG.

The second switch transistor ST2 may electrically connect the source node DTS with the sensing line 14B, based on the scan signal SCAN, and thus, may allow a reference voltage Vpre to be charged into the source node DTS. The second switch transistor ST2 may allow a source node voltage, corresponding to the Ids of the driving transistor DT, to be charged into a line capacitor LCa of the sensing line 14B. The second switch transistor ST2 may include a gate electrode connected with the gate line 15, a drain electrode connected with the sensing line 14B, and a source electrode connected with the source node DTS.

The sensing circuit SU may be implemented as a voltage sensing type. The sensing circuit SU may be for sensing a voltage stored in the line capacitor LCa of the sensing line 14B and may include a reference voltage control switch SW1, a sampling switch SW2, and a sample and hold unit S/H.

The reference voltage control switch SW1 may be turned on and may connect an input terminal of the reference voltage Vpre with the sensing line 14B, based on the reference control voltage signal SPRE. The sampling switch SW2 may be turned on and may connect the sensing line 14B with the sample and hold unit S/H, based on the sampling control signal SAM.

When the driving transistor DT is degraded or there is a touch input, the Vgs of the driving transistor DT may vary, and thus, the Ids of the driving transistor DT may vary. A voltage of the source node DTS of the driving transistor DT may vary based on a level of the Ids of the driving transistor DT. While the second switch transistor ST2 is being turned on, the voltage of the source node DTS of the driving transistor DT may be stored in the line capacitor LCa of the sensing line 14B. The sample and hold unit S/H may sample and hold the voltage of the source node DTS of the driving transistor DT stored in the line capacitor LCa of the sensing line 14B while the sampling switch SW2 is being turned on, and then, may transfer a sampled voltage to the analog-to-digital converter ADC.

Figure 4:
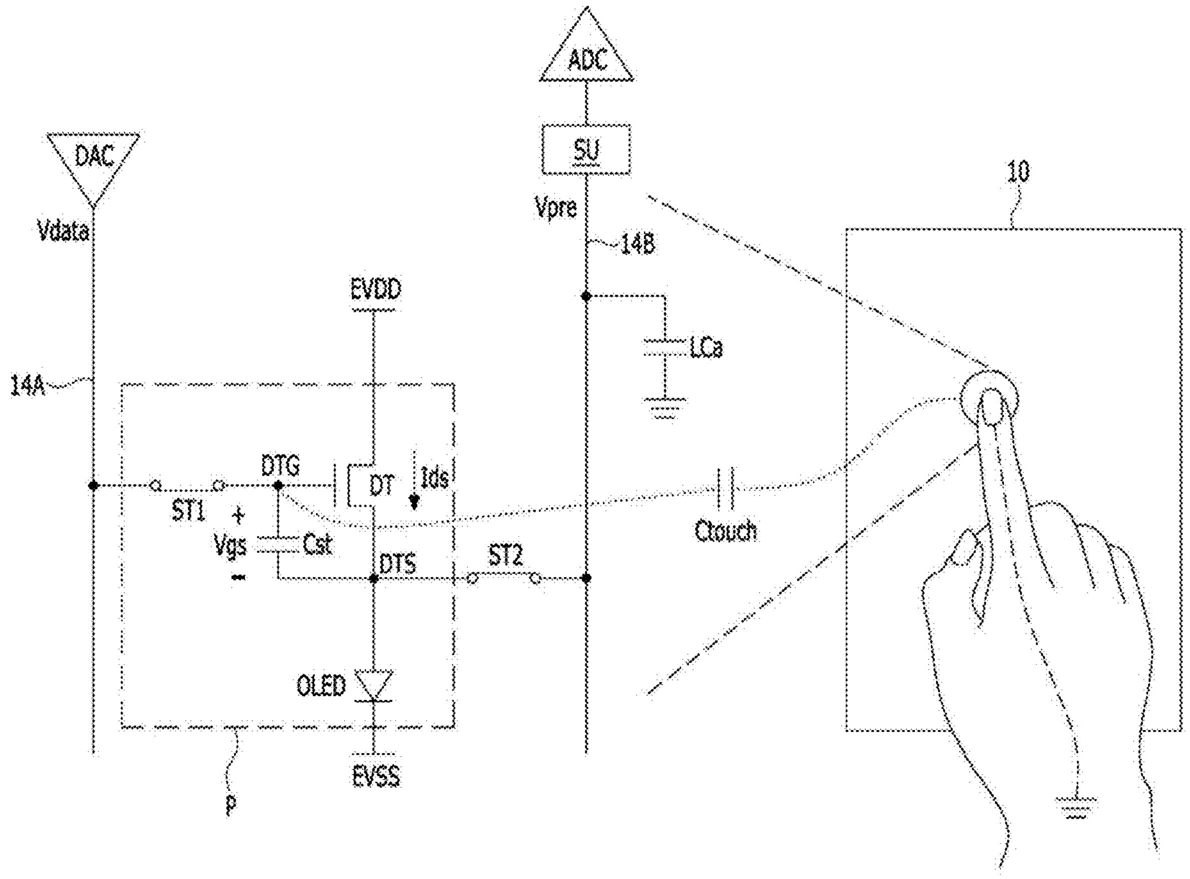
FIGS. 4 and 5 are diagrams illustrating a concept for sensing a source node voltage variation of a pixel based on a touch input.
Figure 5:
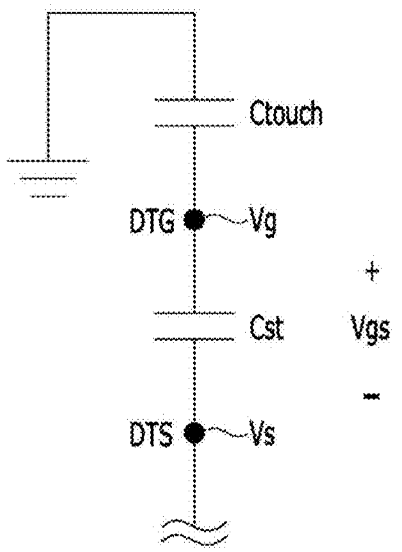

FIGS. 4 and 5 are diagrams illustrating a concept for sensing a source node voltage variation of a pixel based on a touch input.

The principle that a touch input is sensed in the touch sensing display device according to the present embodiment will be described below with reference to FIGS. 4 and 5. When a touch input object such as a finger contacts a screen of a display panel in a state where a Vgs of a driving transistor is set to a difference voltage between a touch driving data voltage and a reference voltage, the Vgs of the driving transistor may be reduced by a touch capacitor Ctouch between the touch input object and the driving transistor.

The touch capacitor Ctouch may be a capacitive capacitor between the touch input object and a gate node DTG of the driving transistor. When the Vgs of the driving transistor is reduced, an Ids of the driving transistor may decrease, and thus, whether there is a touch input may be determined based on that a source node voltage Vs of the driving transistor varies between a pixel touched by the touch input object and an untouched pixel. According to a TFT current formula, the Ids may be proportional to the square of Vgs.

Accordingly, even when the amount of Vgs variation based on a touch input is small, the Ids may be amplified, and thus, the source node voltage Vs may be quickly shifted, thereby enhancing touch sensing performance. In FIG. 5, "Vg" may denote a gate node voltage of the driving transistor.

Figure 6:
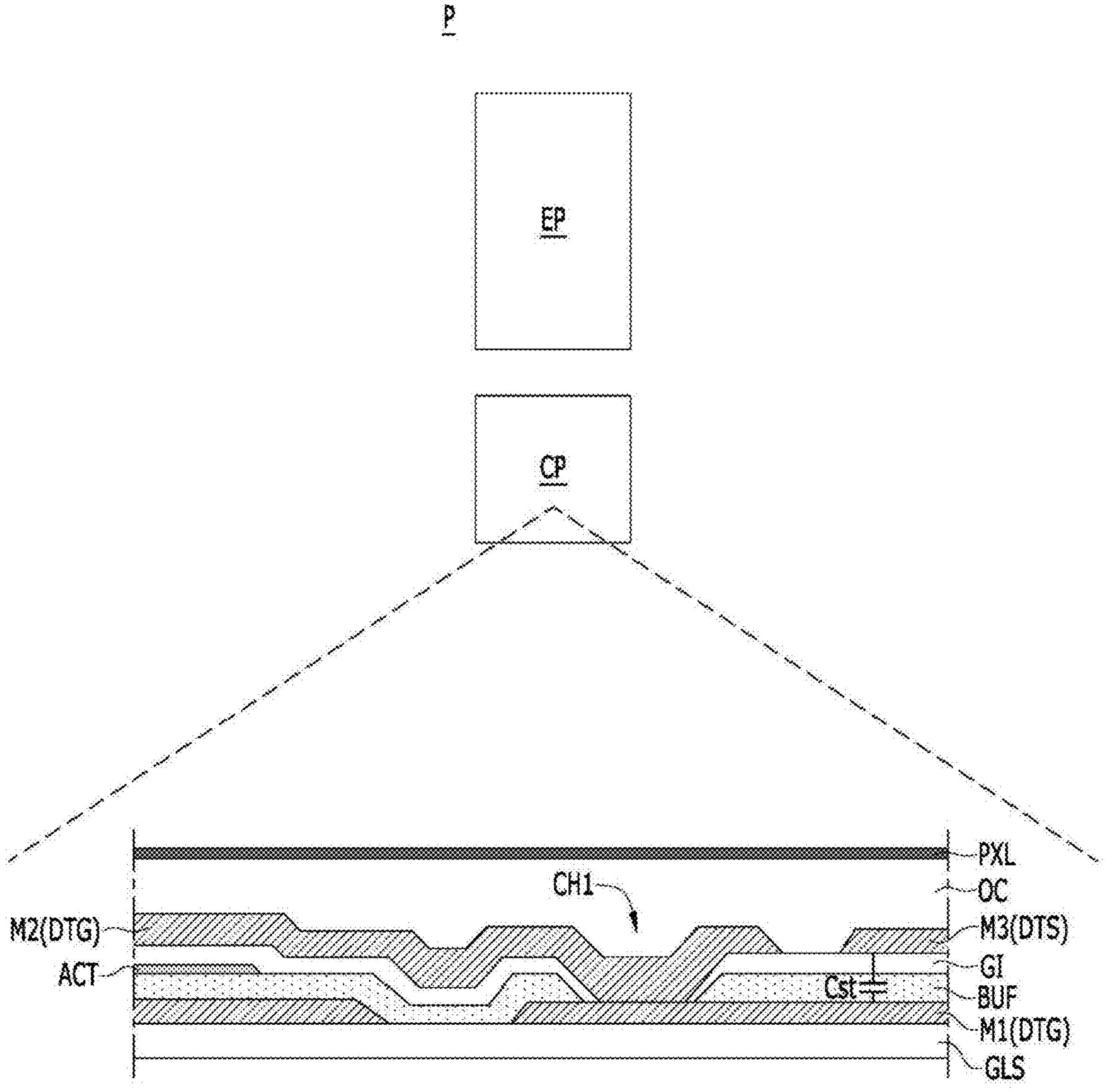
FIG. 6 is a diagram illustrating a cross-sectional structure of a pixel capable of touch sensing.

FIG. 6 is a diagram illustrating a cross-sectional structure of a pixel P capable of touch sensing.

Because an area contacting a touch input object is far greater than an area occupied by one pixel, the touch sensing device according to the present embodiment may sense a touch input with respect to only some pixels (hereinafter referred to as representative pixels), and thus, a touch sensing period may be shortened, thereby enhancing a touch report rate.

As illustrated in FIG. 6, the pixel P may include an emission portion EP which displays an image and a circuit unit CP which does not display an image. The emission portion EP of the pixel P may include the light emitting device OLED of FIG. 3. The circuit unit CP of the representative pixel P may include the driving transistor DT, the storage capacitor Cst, the first switch transistor ST1, and the second switch transistor ST2 of FIG. 3.

The circuit unit CP of the pixel P may include insulation layers BUF, GI, and OC and conductive patterns M1, M2, and PXL stacked on a substrate GLS. In inputting a touch, as Vgs of the driving transistor increases, touch sensing performance may increase. In some implementations, a gate node is connected with the gate electrode of the driving transistor is disposed closer to the substrate GLS than a source node connected with the source electrode of the driving transistor. Therefore, reactivity on a touch input may be improved.

Moreover, because the source node of the driving transistor is connected with an internal capacitor of the light emitting device, when the source node is disposed closer to the substrate GLS than the gate node, a variation of Vgs (i.e., reactivity on a touch input) corresponding to the touch input may be very small, and thus, may be unsuitable for touch sensing. The internal capacitor of the light emitting device may be a capacitor which is between an anode electrode PXL and a cathode electrode.

An array configuration of the pixel P will be described below in detail with reference to FIG. 6.

A voltage of a source node DTS of the pixel P may be a target for touch sensing. The pixel P may include a gate node DTG which is electrically disconnected from the source node DTS. The gate node DTG may include a first conductive pattern M1, which faces the source node DTS with one or more insulation layers GI and BUF therebetween and is one electrode of the storage capacitor Cst, and a second conductive pattern M2 which is connected with the first conductive pattern M1 through a first contact hole CH1 passing through the insulation layers GI and BUF.

The source node DTS may be a third conductive pattern M3 which is disposed on the insulation layers GI and BUF and is the other electrode of the storage capacitor Cst. In this case, the first conductive pattern M1 among the first conductive pattern M1, the second conductive pattern M2, and the third conductive pattern M3 may be disposed closest to the substrate GLS. That is, the first conductive pattern M1 formed close to the substrate GLS may function as a touch electrode, and moreover, may function as a light blocking pattern. The first conductive pattern M1 may block external light which is incident on a semiconductor layer ACT of the driving transistor, thereby preventing a characteristic value of the driving transistor from being degraded by the external light.

The first conductive pattern M1 may be covered by a buffer insulation layer BUF and a gate insulation layer GI and may be electrically connected with the second conductive pattern M2, disposed on the gate insulation layer GI, through the first contact hole CH1. The second conductive pattern M2 may configure the gate electrode of the driving transistor.

The third conductive pattern M3 which is the other electrode of the storage capacitor Cst may be disposed on the first conductive pattern M1 with the buffer insulation layer BUF and the gate insulation layer GI therebetween. The third conductive pattern M3 may include the same material as that of the second conductive pattern M2 and may configure the same layer along with the second conductive pattern M2. The source electrode of the driving transistor may be formed by providing a conductivity of the semiconductor layer ACT or stacking a conductive layer on the semiconductor layer ACT and may be electrically connected with the third conductive pattern M3 through a contact hole.

The second conductive pattern M2 and the third conductive pattern M3 may be covered by a planarization layer OC, and the anode electrode PXL of the light emitting device may be formed on the planarization layer OC. Although not shown, the source node DTS of the driving transistor and the anode electrode PXL of the light emitting device may be electrically connected with each other through a contact hole passing through the planarization layer OC.

Figure 7:
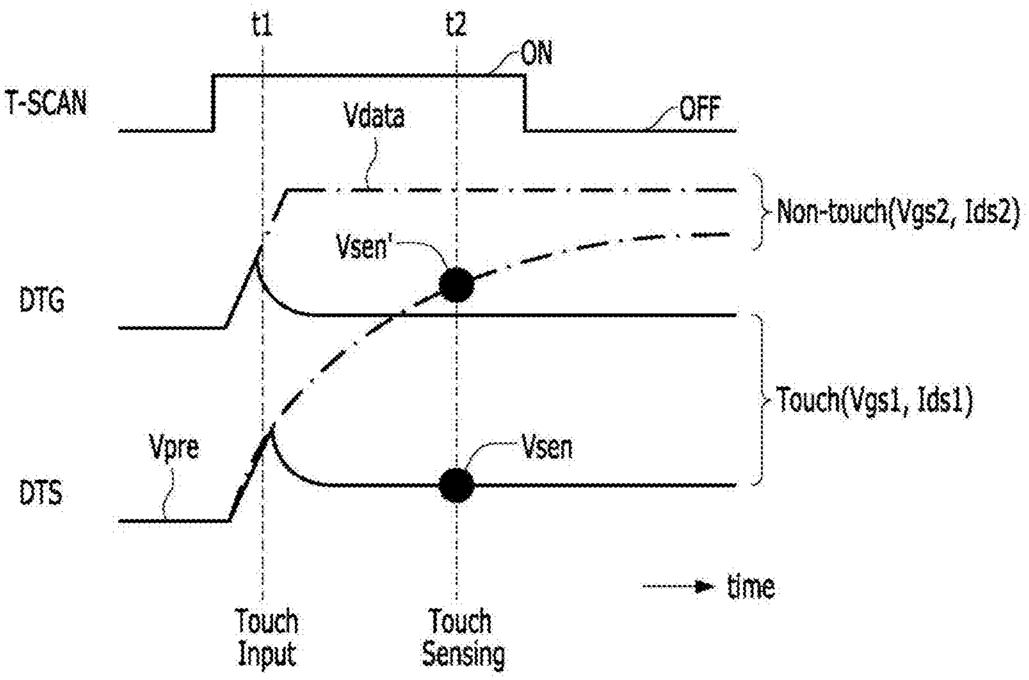
FIG. 7 is a diagram illustrating a voltage variation of each of a gate node and a source node of a driving transistor when a touch input is applied.

FIG. 7 is a diagram illustrating a voltage variation of each of a gate node and a source node of a driving transistor when a touch input is applied.

As illustrated in FIG. 7, a touch input corresponding to pixels may be sensed in an on pulse period of a touch scan signal T-SCAN. In response to the touch scan signal T-SCAN, a touch driving data voltage may be applied to a gate node DTG of a driving transistor. A reference voltage Vpre may be applied to a source node DTS of the driving transistor. When the driving transistor is turned on, Ids may flow in the driving transistor.

When a touch input is received at a first timing t1 of the on pulse period, Ids1 corresponding to Vgs1 may flow in the driving transistor. The Ids1 of the driving transistor may be less than Ids2 of when there is no touch input. In other words, Ids1 of a first representative pixel corresponding to a position at which there is a touch input may be less than Ids2 of a second representative pixel corresponding to a position at which there is no touch input.

When touch sensing is performed at a second timing t2 of the on pulse period, a voltage of the source node DTS of the driving transistor may be sensed as Vsen based on Ids1. The Vsen of the driving transistor may be less than Vsen' based on Ids2 of when there is no touch input. In other words, Vsen of the first representative pixel corresponding to a position at which there is a touch input may be less than Vsen' of the second representative pixel corresponding to a position at which there is no touch input. Accordingly, whether there is a touch input corresponding to pixels may be determined based on a difference between Vsen and Vsen' which are a voltage of the source node DTS of the driving transistor.

Figure 8:
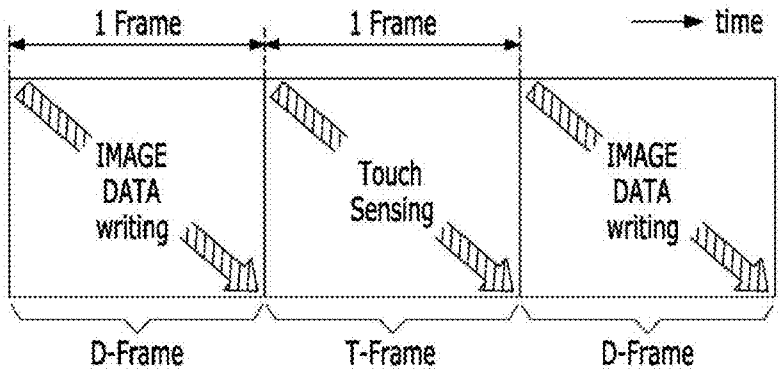
FIGS. 8 and 9 are diagrams illustrating an example where display driving and touch sensing driving are implemented based on time division.
Figure 9:
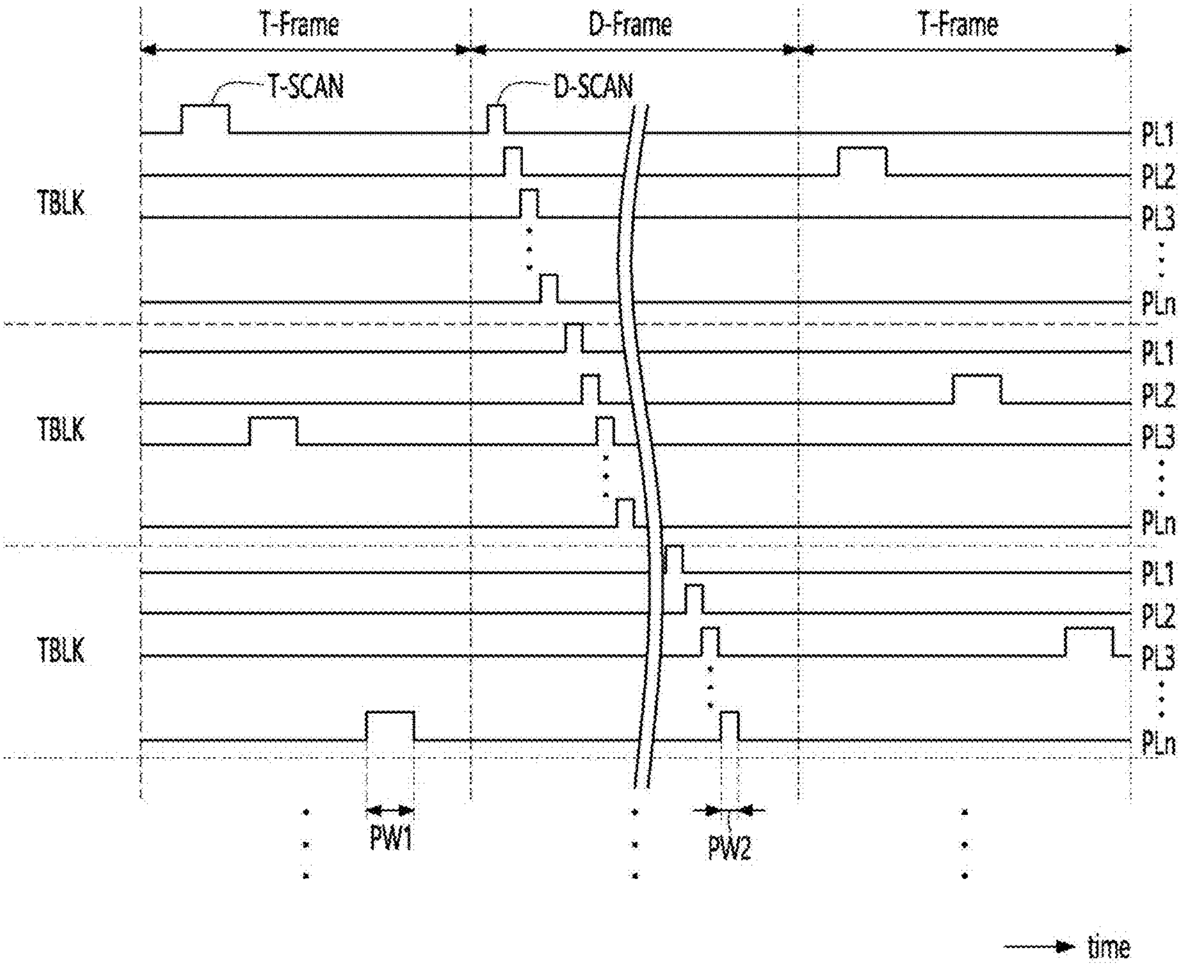

FIGS. 8 and 9 are diagrams illustrating an example where display driving and touch sensing driving are implemented based on time division.

As illustrated in FIG. 8, a display frame D-Frame for display driving and a touch frame T-Frame for touch sensing driving may be alternated. The touch frame T-Frame may be arranged between two adjacent display frames D-Frame.

Display driving may be for writing image data in all pixels P of a display panel to update an image and may be performed in a vertical active period of the display frame D-Frame. Touch sensing driving may be performed in a vertical active period of the touch frame T-Frame, and because touch sensing driving is performed on only representative pixels P, a time allocated to touch sensing may be secured to be long. Because the time allocated to touch sensing is long, a touch sensing period may be shortened, and a touch report rate may be enhanced.

Furthermore, external compensation driving may be performed in a vertical blank period of each of the display frame D-Frame and the touch frame T-Frame.

As illustrated in FIG. 9, a screen of a display panel may be divided into a plurality of touch screen blocks TBLK, and a touch input may be sensed by touch screen block TBLK units. Each of the touch screen blocks TBLK may include a plurality of pixel set lines PL1 to PLn, and one of the pixel set lines PL1 to PLn in each touch screen block TBLK may be configured with representative pixels.

A gate driving circuit may apply a display scan signal D-SCAN to all pixels in display frames D-Frame and may apply a touch scan signal T-SCAN to representative pixels in touch frames T-Frame. An on pulse width PW1 of the touch scan signal T-SCAN may be wider than an on pulse width PW2 of the display scan signal D-SCAN. Because the on pulse width PW1 of the touch scan signal T-SCAN is wide, touch sensing performance for the touch screen blocks TBLK may be enhanced.

Figure 10:
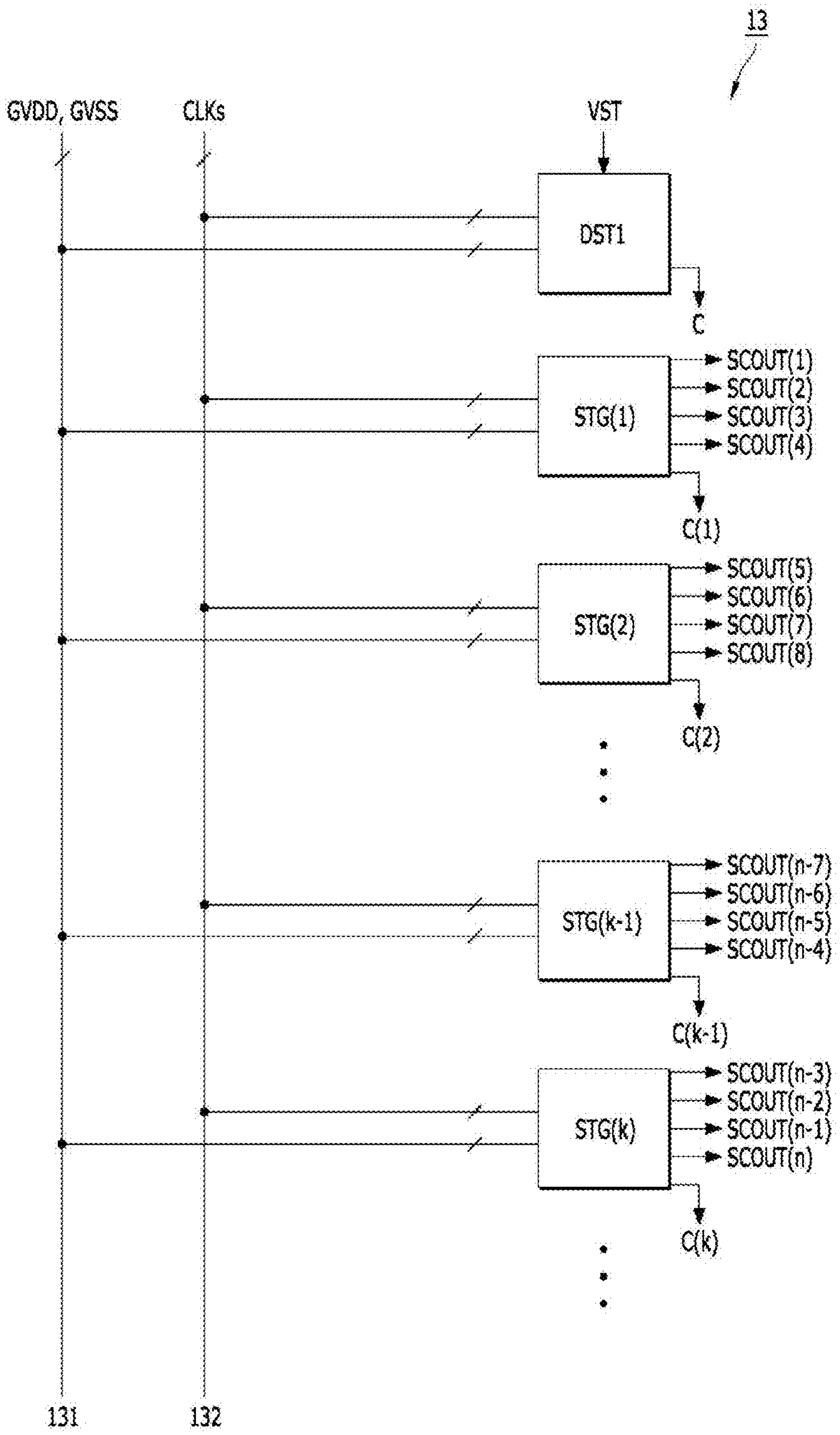
FIGS. 10 and 11 are diagrams schematically illustrating a stage configuration of a gate driving circuit.
Figure 11:
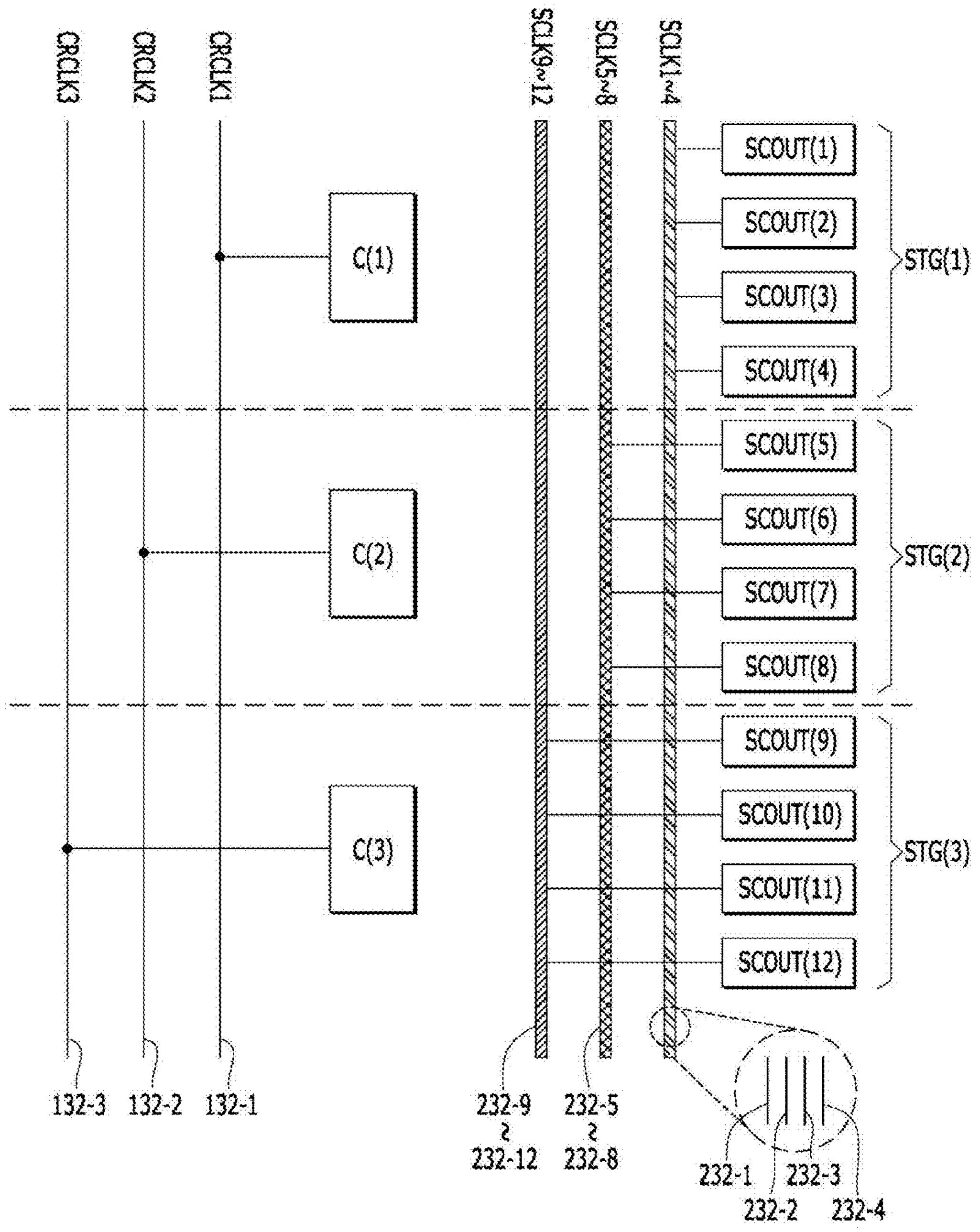

FIGS. 10 and 11 are diagrams schematically illustrating a stage configuration of a gate driving circuit.

As illustrated in FIGS. 10 and 11, the gate driving circuit 13 may include first to $k^{th}$ stage circuits STG(1) to STG(k), a gate driving voltage line 131, and a clock signal line 132. Also, the gate driving circuit 13 may further include a dummy stage circuit DST1 which is disposed at a previous stage with respect to the first stage circuit STG(1).

The gate driving voltage line 131 may transfer a high level voltage VDD and a low level voltage GVSS, supplied from a power supply circuit (not shown), to the first to $k^{th}$ stage circuits STG(1) to STG(k) and the dummy stage circuit DST1. In the present embodiment, the gate driving voltage line 131 may include two high level voltage lines which respectively transfer a first high level voltage GVDD1 and a second high level voltage GVDD2 having different voltage levels and three low level voltage lines which respectively transfer a first low level voltage GVSS1, a second low level voltage GVSS2, and a third low level voltage GVSS3 having different voltage levels. However, this may be merely an embodiment, and the number of voltage lines included in the gate driving voltage line 131 may be varied.

The clock signal line 132 may transfer a plurality of clock signals (for example, carry clock signals CRCLK and scan clock signals SCCLK), supplied from the timing controller 11, to the first to $k^{th}$ stage circuits STG(1) to STG(k) and the dummy stage circuit DST1.

The carry clock signals CRCLK may be implemented as first to third carry clocks CRCLK1, CRCLK2, and CRCLK3 having different phases, but are not limited thereto. The first to third carry clocks CRCLK1, CRCLK2, and CRCLK3 may be shifted in phase while swinging between a gate on voltage and a gate off voltage. The first to third carry clocks CRCLK1, CRCLK2, and CRCLK3 may be respectively supplied to the first to $k^{th}$ stage circuits STG(1) to STG(k) through first to third carry clock lines 132-1, 132-2, and 132-3. Each of the first to $k^{th}$ stage circuits STG(1) to STG(k) may receive one of the first to third carry clocks CRCLK1, CRCLK2, and CRCLK3, based on a phase sequence scheme, and may output carry signals C(1) to C(K) corresponding to the received carry clock. Each of the first to $k^{th}$ stage circuits STG(1) to STG(k) may be activated in stage operation, based on a previous carry signal.

The scan clock signals SCCLK may be implemented as first to twelfth scan clocks SCLK1 to SCLK12 having different phases, but are not limited thereto. The first to twelfth scan clocks SCLK1 to SCLK12 may be shifted in phase while swinging between the gate on voltage and the gate off voltage. The first to twelfth scan clocks SCLK1 to SCLK12 may be respectively supplied to the first to $k^{th}$ stage circuits STG(1) to STG(k) through first to twelfth scan clock lines 232-1 to 232-12. Each of the first to $k^{th}$ stage circuits STG(1) to STG(k) may receive one of the first to twelfth scan clocks SCLK1 to SCLK12, based on the phase sequence scheme, and may output scan signals SCOUT(1) to SCOUT(n) corresponding to the received scan clock. Each of the first to $k^{th}$ stage circuits STG(1) to STG(k) may be activated in stage operation, based on a previous carry signal.

Each stage circuit may output four gate signals SCOUT and one carry signal C. For example, the first stage circuit STG(1) may output first to fourth gate signals SCOUT(1) to SCOUT(4) and a first carry signal C(1), and the second stage circuit STG(2) may output fifth to eighth gate signals SCOUT(5) to SCOUT(8) and a second carry signal C(2).

The number of gate signals output from the first to $k^{th}$ stage circuits STG(1) to STG(k) may match the number of gate lines which are provided in the display panel. The number of stage circuits "k" may be ¼ of the number of gate lines "n." That is, k may be n/4 (i.e., k=n/4).

As described above, when the number of stage circuits "k" is designed to be ¼ of the number of gate lines "n," a mount area of the gate driving circuit 13 may be reduced, and thus, a bezel size of the display panel may be reduced.

Figure 12:
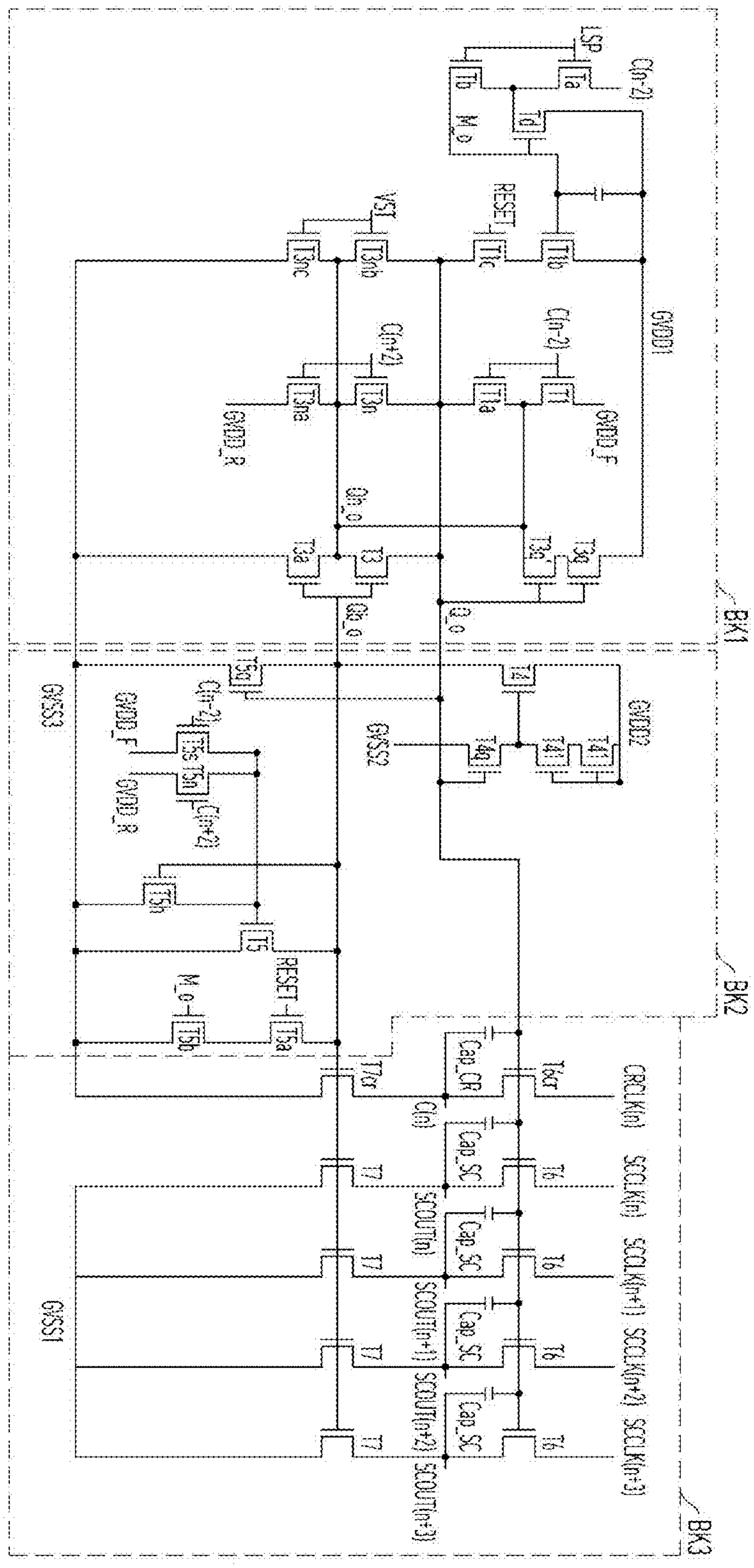
FIG. 12 is a diagram illustrating a configuration of an $n^{th}$ stage circuit included in a gate driving circuit.

FIG. 12 is a diagram illustrating a configuration of an $n^{th}$ stage circuit included in a gate driving circuit.

As illustrated in FIG. 12, the $n^{th}$ stage circuit may include an Q node Q_o, a QH node Qh_o, and a QB node Qb_o. The $n^{th}$ stage circuit may include an M and Q node controller BK1, a QB node controller BK2, a signal output unit BK3. The $n^{th}$ stage circuit may denote an arbitrary stage included in a gate driving circuit.

The M and Q node controller BK1 may start an operation, based on a ling selection signal LSP applied through a line selection signal line. The M and Q node controller BK1 may charge the Q node Q_o at a first high-level voltage GVDD1 level in response to an input of a previous carry signal C(n−2) and may discharge the Q node Q_o at a third high-level voltage GVSS3 level in response to an input of a start signal VST applied through the start signal line. Also, the M and Q node controller BK1 may charge the Q node Q_o at a forward voltage GVDD_F level applied through a forward voltage line in response to an input of the previous carry signal C(n−2) and may charge the Q node Q_o at a reverse voltage GVDD_R level applied through a reverse voltage line in response to an input of a next carry signal C(n+2). In some implementations, the M and Q node controller BK1 may include a plurality of transistors, and this will be described below.

An $A^{th}$ transistor Ta and a $B^{th}$ transistor Tb may transfer the previous carry signal C(n−2) to an M node M_o in response to the line selection signal LSP. A gate electrode of each of the $A^{th}$ transistor Ta and the $B^{th}$ transistor Tb may be connected to the line selection signal line, through which the line selection signal LSP is applied, in common. A first electrode of the $A^{th}$ transistor Ta may be connected to a previous carry signal line through which the previous carry signal C(n−2) is applied, a first electrode of the $B^{th}$ transistor Tb may be connected to a second electrode of the $A^{th}$ transistor Ta, and the second electrode of the $B^{th}$ transistor Tb may be connected to the M node M_o. A $C^{th}$ transistor may include a gate electrode connected to the M node M_o, a first electrode connected to the first high-level voltage line which transfers the first high-level voltage GVDD1, and a second electrode connected to the second electrode of the $A^{th}$ transistor Ta and the first electrode of the $B^{th}$ transistor Tb.

A $1A^{th}$ transistor T1*a* and a first transistor T1 may transfer the forward voltage GVDD_F to the Q node Q_o in response to the previous carry signal C(n−2). A gate electrode of each of the $1A^{th}$ transistor T1*a* and the first transistor T1 may be connected to the previous carry signal line, through which the previous carry signal C(n−2) is applied, in common. The first transistor T1 may include a first electrode connected to the forward voltage line which transfers the forward voltage GVDD_F and a second electrode connected to a QH node Qh_o. The $1A^{th}$ transistor T1*a* may include a first electrode connected to the QH node Qh_o and a second electrode connected to the Q node Q_o.

A $1B^{th}$ transistor T1*b* and a $1C^{th}$ transistor T1*c* may transfer the first high-level voltage GVDD1 to the Q node Q_o in response to a voltage of the M node M_o. The $1B^{th}$ transistor T1*b* may include a gate electrode connected to the M node M_o, a first electrode connected to the first high-level voltage line which transfers the first high-level voltage GVDD1, and a second electrode connected to a first electrode of the $1C^{th}$ transistor T1*c*. The $1C^{th}$ transistor T1*c* may include a gate electrode connected to a reset signal line through which a reset signal RESET is applied, a first electrode connected to the second electrode of the 13th transistor T1*b*, and a second electrode connected to the Q node Q_o.

A $3NB^{th}$ transistor T3*nb* and a $3NC^{th}$ transistor T3*nc* may transfer a third low-level voltage GVSS3 to the Q node Q_o in response to the start signal VST. A gate electrode of each of the $3NB^{th}$ transistor T3*nb* and the $3NC^{th}$ transistor T3*nc* may be connected to a start signal line in common. The $3NB^{th}$ transistor T3*nb* may include a first electrode connected to the Q node Q_o and a second electrode connected to the QH node Qh_o and a first electrode of the $3NC^{th}$ transistor T3*nc*. The $3NC^{th}$ transistor T3*nc* may include the first electrode connected to the QH node Qh_o and a second electrode connected to a third low-level voltage line which transfers the third low-level voltage GVSS3.

A $3N^{th}$ transistor T3*n* and a $3NA^{th}$ transistor T3*na* may transfer the reverse voltage GVDD_R to the QH node Qh_o and the Q node Q_o in response to the next carry signal C(n+2). A gate electrode of each of the $3N^{th}$ transistor T3*n* and the $3NA^{th}$ transistor T3*na* may be connected to the next carry signal line, which transfers the next carry signal C(n+2), in common. The $3N^{th}$ transistor T3*n* may include a first electrode connected to the Q node Q_o and a second electrode connected to the QH node Qh_o and a first electrode of the $3NA^{th}$ transistor T3*na*. The $3NA^{th}$ transistor T3*na* may include a first electrode connected to the second electrode of the $3N^{th}$ transistor T3*n* and the second electrode connected to the reverse voltage line which transfers the reverse voltage GVDD_R.

A $3Q^{th}$ transistor T3*q* may transfer the first high-level voltage GVDD1 to the QH node Qh_o in response to the voltage of the Q node Q_o. The $3Q^{th}$ transistor T3*q* may be formed as a dual gate electrode (double gate electrode) type so as to minimize the occurrence of a leakage current. The $3Q^{th}$ transistor T3*q* may include a first electrode connected to the first high-level voltage line and a second electrode connected to the QH node Qh_o.

A third transistor T3 and a $3A^{th}$ transistor T3*a* may transfer a third low-level voltage GVSS3 to the QH node Qh_o and the Q node Q_o in response to a voltage of a QB node Qb_o. A gate electrode of each of the third transistor T3 and the $3A^{th}$ transistor T3*a* may be connected to the QB node Qb_o in common. The third transistor T3 may include a first electrode connected to the Q node Q_o and a second electrode connected to a first electrode of the $3A^{th}$ transistor T3*a*. The $3A^{th}$ transistor T3*a* may include the first electrode connected to the QH node Qh_o and the second electrode of the third transistor T3 and a second electrode connected to the third low-level voltage line which transfers the third low-level voltage GVSS3.

The QB node controller BK2 may charge a voltage of the QB node Qb_o, based on the voltage of the Q node Q_o. In some implementations, the QB node controller BK2 may include a plurality of transistors, and this will be described below.

A $41^{st}$ transistor T41 may include a gate electrode and a first electrode, which are connected to a second high-level voltage line transferring the second high-level voltage GVDD2, and a second electrode connected to a gate electrode of a fourth transistor T4 and a first electrode of a $4Q^{th}$ transistor T4*q*. The $41^{st}$ transistor T41 may be formed as a dual gate electrode (double gate electrode) type so as to minimize the occurrence of a leakage current. The fourth transistor T4 may transfer the second high-level voltage GVDD2 to the QB node Qb_o in response to the second high-level voltage GVDD2. The fourth transistor T4 may include a first electrode connected to the second high-level voltage line and a second electrode connected to the QB node Qb_o. The $4Q^{th}$ transistor T4*q* may transfer the second low-level voltage GVSS2 to the gate electrode of the fourth transistor T4 in response to the voltage of the Q node Q_o. The $4Q^{th}$ transistor T4*q* may include a gate electrode connected to the Q node Q_o, a first electrode connected to the gate electrode of the fourth transistor T4, and a second electrode connected to the second low-level voltage line.

A $5Q^{th}$ transistor T5*q* may transfer the third low-level voltage GVSS3 to the QB node Qb_o in response to the voltage of the Q node Q_o. The $5Q^{th}$ transistor T5*q* may include a gate electrode connected to the Q node Q_o, a first electrode connected to the QB node Qb_o, and a second electrode connected to the third low-level voltage line.

Moreover, the QB node controller BK2 may transfer the third low-level voltage GVSS3 to the QB node Qb_o with the forward voltage GVDD_F or the reverse voltage GVDD_R which is applied in response to the previous carry signal C(n−2) or the next carry signal C(n+2). A 55th transistor T5*s* may transfer the forward voltage GVDD_F to a gate electrode of a fifth transistor T5 in response to the previous carry signal C(n−2). The 5th transistor T5*s* may include a gate electrode connected to the previous carry signal line, a first electrode connected to the gate electrode of the fifth transistor T5, and a second electrode connected to the forward voltage line. A $5N^{th}$ transistor T5*n* may transfer the reverse voltage GVDD_R to the gate electrode of the fifth transistor T5 in response to the next carry signal C(n+2). The $5N^{th}$ transistor T5*n* may include a gate electrode connected to the next carry signal line, a first electrode connected to the gate electrode of the fifth transistor T5, and a second electrode connected to the reverse voltage line. A $5H^{th}$ transistor T5*h* may transfer the third low-level voltage GVSS3 to the gate electrode of the fifth transistor T5 in response to the voltage of the QB node Qb_o. The $5H^{th}$ transistor T5*h* may include a gate electrode connected to the QB node Qb_o, a first electrode connected to the gate electrode of the fifth transistor T5, and a second electrode connected to the third low-level voltage line.

Moreover, the QB node controller BK2 may transfer the third low-level voltage GVSS3 to the QB node Qb_o in response to the reset signal RESET and a voltage of the M node M_o. A $5A^{th}$ transistor T5*a* may include a gate electrode connected to the reset signal line, a first electrode connected to the QB node Qb_o, and a second electrode connected to a first electrode of a $5B^{th}$ transistor T5*b*. The $5B^{th}$ transistor T5*b* may include a gate electrode connected to the M node M_o, a first electrode connected to the second electrode of the $5A^{th}$ transistor T5*a*, and a second electrode connected to the third low-level voltage line.

The signal output unit BK3 may output a carry clock CRCLK(n) as a carry signal C(n) of an on voltage and first to fourth scan clocks SCCLK(n) to SCCLK(n+3) as first to fourth scan signals SCOUT(n) to SCOUT(n+3) of an on voltage, while the Q node Q_o is being charged at an on voltage level. The signal output unit BK3 may output the third low-level voltage GVSS3 as a carry signal C(n) of an off voltage and the second low-level voltage GVSS2 as the first to fourth scan signals SCOUT(n) to SCOUT(n+3) of an off voltage, while the QB node Qb_o is being charged at an on voltage level. In some implementations, the signal output unit BK3 may include a plurality of transistors and a plurality of capacitors, and this will be described below.

A $6CR^{th}$ transistor T6*cr* and a $7CR^{th}$ transistor T7*cr* may output the carry signal C(n). The $6CR^{th}$ transistor T6*cr* may include a gate electrode connected to the Q node Q_o, a first electrode connected to a carry clock line transferring the carry clock CRCLK(n), and a second electrode connected to a carry signal output line. A carry capacitor Cap_CR may bootstrap the Q node Q_o, based on the carry clock CRCLK (n). The carry capacitor Cap_CR may include a first electrode and a second electrode, which are respectively connected to the gate electrode and the second electrode of the $6CR^{th}$ transistor T6*cr*. The $7CR^{th}$ transistor T7*cr* may include a gate electrode connected to the QB node Qb_o, a first electrode connected to the carry signal output line, and a second electrode connected to the third low-level voltage line.

Four sixth transistors T6 and four seventh transistors T7 may output the first to fourth scan signals SCOUT(n) to SCOUT(n+3). The four sixth transistors T6 may respectively include gate electrodes connected to the Q node Q_o, first electrodes divisionally connected to first to fourth scan clock lines, and second electrodes divisionally connected to first to fourth scan signal output lines. Four scan capacitors Cap_SC may bootstrap the Q node Q_o, based on the first to fourth scan clocks SCCLK(n) to SCCLK(n+3). The four scan capacitors Cap_SC may each include a first electrode and a second electrode, which are respectively connected to the gate electrode and the second electrode of each of the four sixth transistors T6. The four seventh transistors T7 may respectively include gate electrodes connected to the QB node Qb_o, first electrodes divisionally connected to the scan signal output line, and second electrodes connected to the first low-level voltage line in common.

Figure 13:
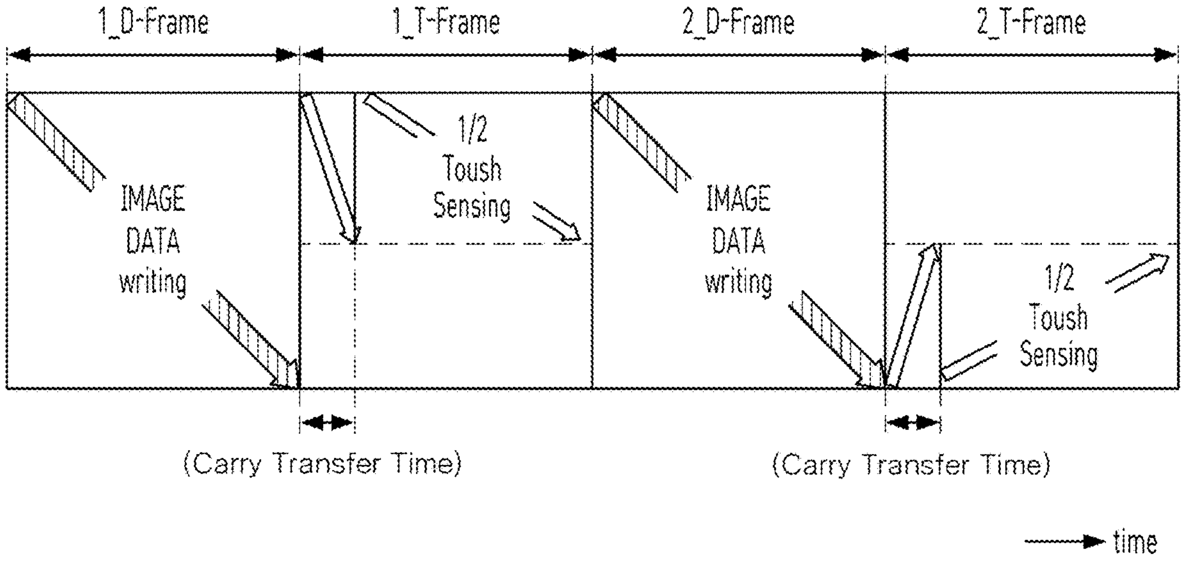
FIG. 13 is a diagram for schematically describing a carry signal transfer method for securing a touch scan time according to an embodiment.
Figure 14:
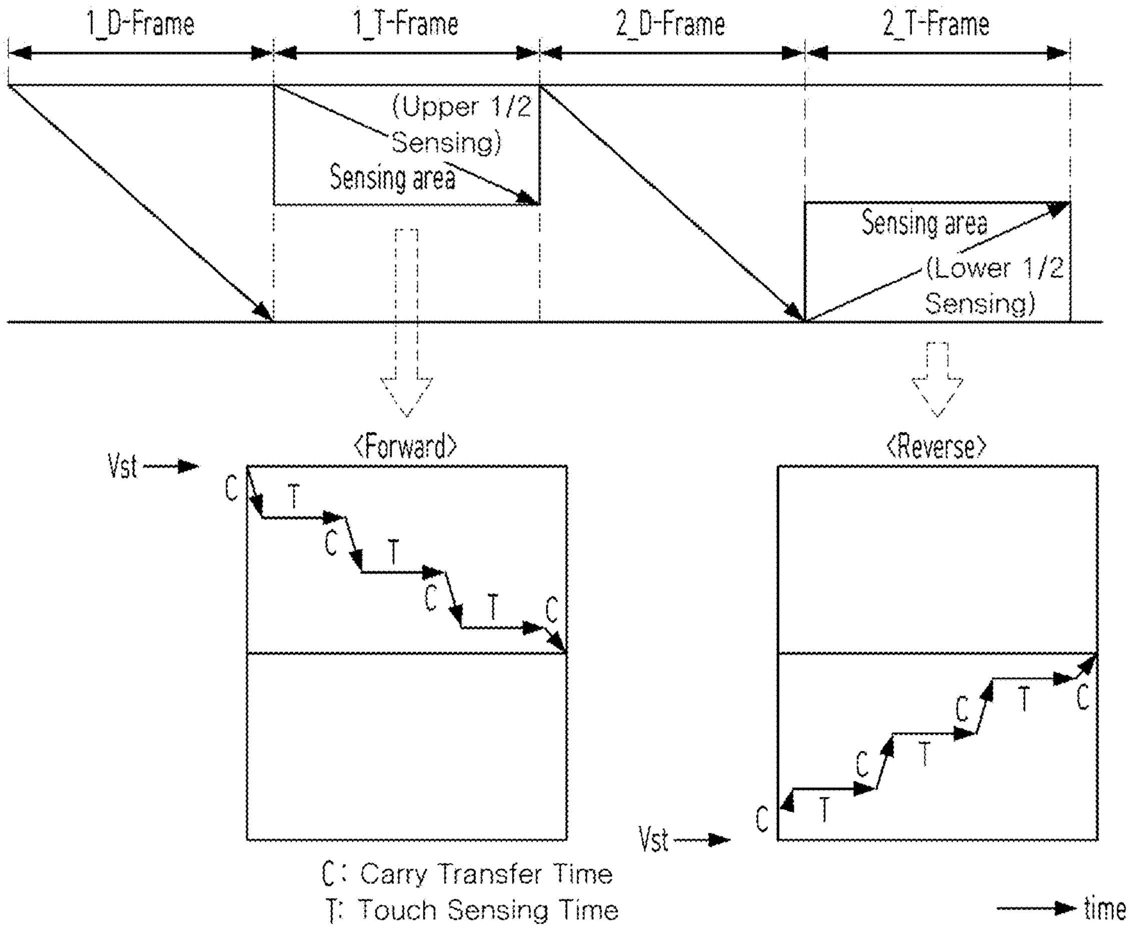
FIG. 14 is a diagram for describing in more detail a carry signal transfer method for securing a touch scan time according to an embodiment.

FIG. 13 is a diagram for schematically describing a carry signal transfer method for securing a touch scan time according to an embodiment, and FIG. 14 is a diagram for describing in more detail a carry signal transfer method for securing a touch scan time according to an embodiment.

As illustrated in FIG. 13, an embodiment may divide each of a first touch frame 1_T-Frame and a second touch frame 2_T-Frame by ½ to perform touch sensing, so as to secure a touch scan time. The first touch frame 1_T-Frame may be arranged after or before a first display frame 1_D-Frame, and the second touch frame 2_T-Frame may be arranged after or before a second display frame 2_D-Frame.

As in an embodiment, a carry signal transfer method of a gate driving circuit may be changed for dividing each of the first touch frame 1_T-Frame and the second touch frame 2_T-Frame by ½. This will be described below with reference to FIG. 14.

First, a gate driving circuit according to an embodiment may operate so that touch sensing (see a sensing area) is performed on an upper ½ region of a display panel during the first touch frame 1_T-Frame. The gate driving circuit may be set to a forward condition so that a carry signal C is generated in an upper region of the display panel and may be set so that a start signal VST is applied to a first stage circuit (or a first dummy stage circuit arranged at a front end with respect to the first stage circuit) where a first gate line is disposed.

In this case, the gate driving circuit may start an operation from the first stage circuit to output the carry signal C, and although not shown, may output a scan signal so that touch sensing is performed for a touch sensing time T. Also, such an operation may be performed sequentially up to an $f^{th}$ stage circuit, where a gate line is disposed in a center region of the display panel, from a first stage circuit where a first gate line of the display panel is disposed.

Subsequently, the gate driving circuit according to an embodiment may operate so that touch sensing (see a sensing area) is performed on a lower ½ region of the display panel during the second touch frame 2_T-Frame. The gate driving circuit may be set to a reverse condition so that the carry signal C is generated in a lower region of the display panel and may be set so that the start signal VST is applied to a $k^{th}$ stage circuit (or a $k^{th}$ dummy stage circuit arranged at a next end with respect to the $k^{th}$ stage circuit) where a last gate line is disposed.

In this case, the gate driving circuit may start an operation from the $k^{th}$ stage circuit to output the carry signal C, and although not shown, may output the scan signal so that touch sensing is performed for the touch sensing time T. Also, such an operation may be performed sequentially up to an $f+1^{th}$ stage circuit, where a gate line is disposed in the center region of the display panel, from the $k^{th}$ stage circuit where the last gate line of the display panel is disposed.

Hereinafter, a gate driving circuit implemented based on the stages of FIGS. 9 to 12 described above and signals needed for an operation and driving of the gate driving circuit will be described in conjunction with each other. However, the gate driving circuit for realizing an embodiment may be implemented as various types, but an embodiment is not limited thereto.

Figure 15:
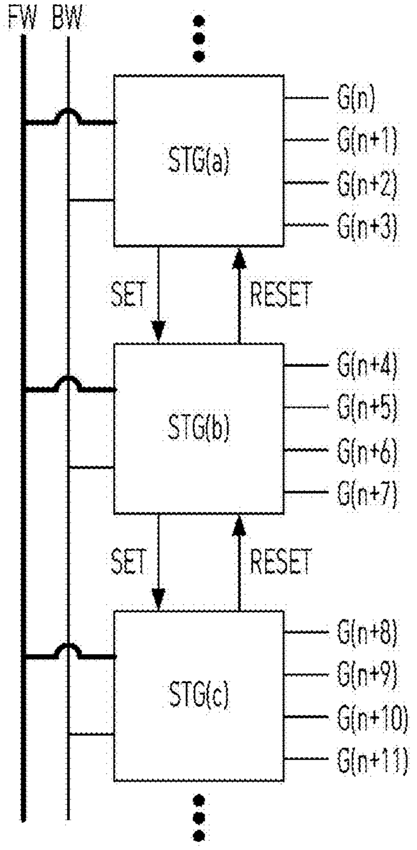
FIG. 15 is a block diagram for describing a signal relationship transferred and received between stages when a driving condition of a gate driving circuit is set to forward.
Figure 16:
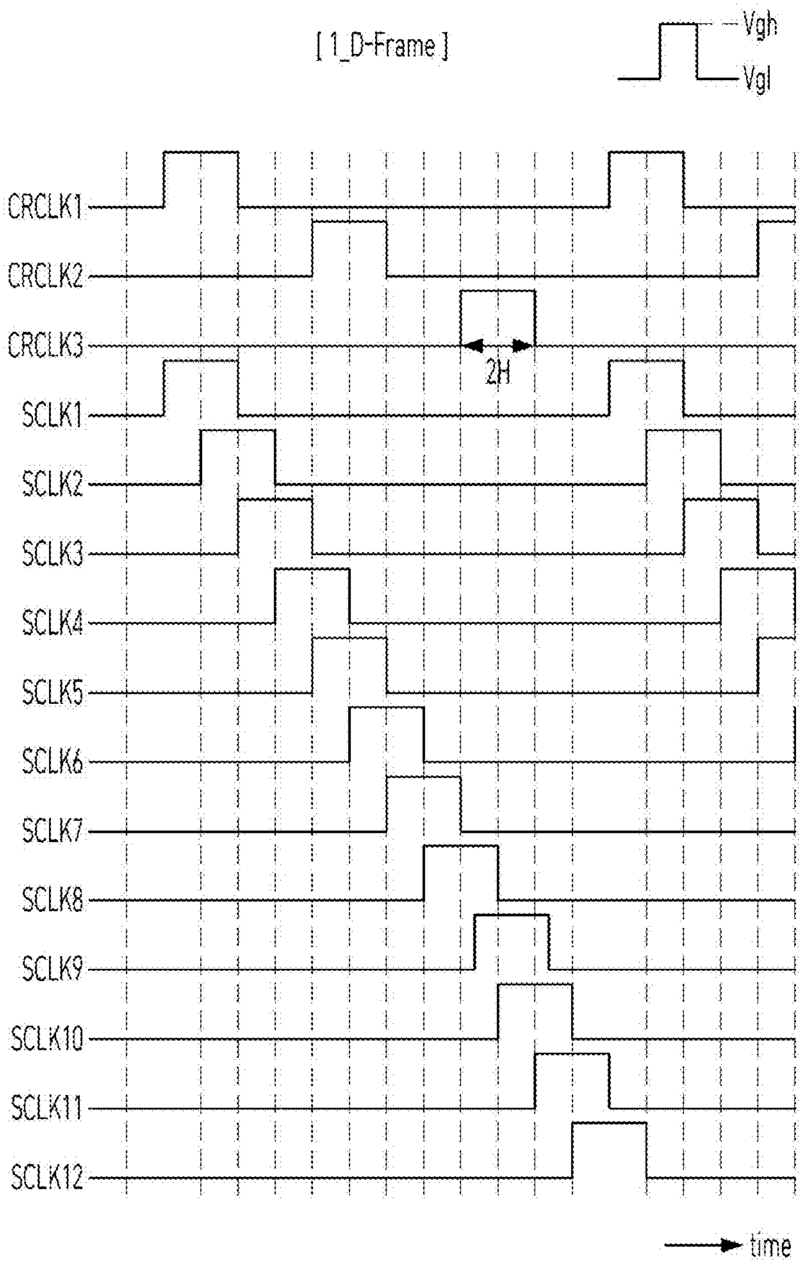
FIG. 16 is a waveform diagram showing carry clocks and scan clocks applied to a gate driving circuit during a first display frame under the condition of FIG. 15.
Figure 17:
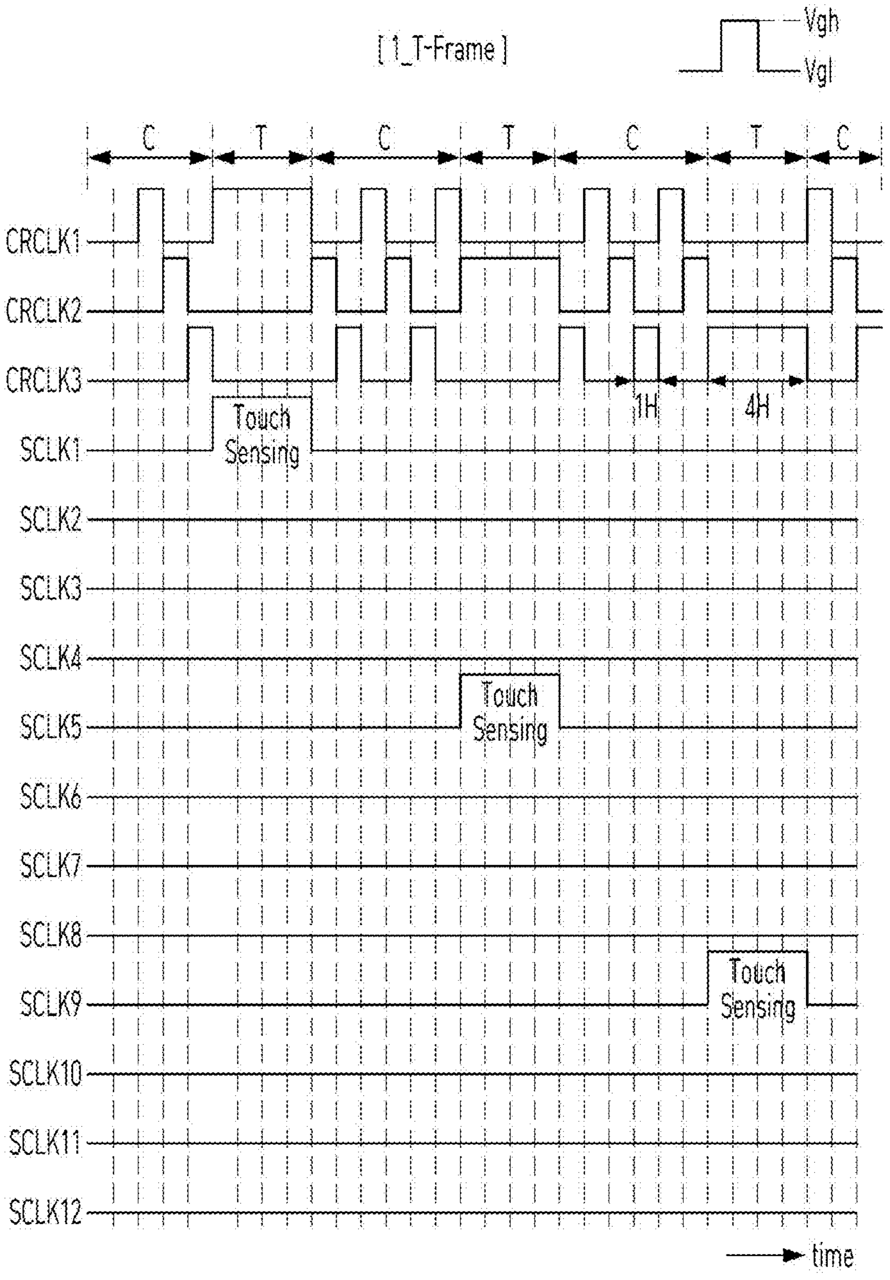
FIG. 17 is a waveform diagram showing carry clocks and scan clocks applied to the gate driving circuit during a first touch frame under the condition of FIG. 15.

FIG. 15 is a block diagram for describing a signal relationship transferred and received between stages when a driving condition of a gate driving circuit is set to forward, FIG. 16 is a waveform diagram showing carry clocks and scan clocks applied to a gate driving circuit during a first display frame under the condition of FIG. 15, and FIG. 17 is a waveform diagram showing carry clocks and scan clocks applied to the gate driving circuit during a first touch frame under the condition of FIG. 15.

As illustrated in FIG. 15, when a driving condition of the gate driving circuit is set to forward, a forward voltage having a high voltage level may be applied to a forward voltage line FW connected to stages STG(a) to STG(c). On the other hand, a reverse voltage having a low voltage level (or a ground voltage level) may be applied to a reverse voltage line BW connected to the stages STG(a) to STG(c).

When the driving condition of the gate driving circuit is set to forward, a set signal SET may be transferred (forward direction) from an $A^{th}$ stage STG(a) to a $B^{th}$ stage STG(b) and from the $B^{th}$ stage STG(b) to a $C^{th}$ stage STG(c). On the other hand, a reset signal RESET may be transferred (reverse direction) from the $C^{th}$ stage STG(c) to the $B^{th}$ stage STG(b) and from the $B^{th}$ stage STG(b) to the $A^{th}$ stage STG(a).

As illustrated in FIG. 16, when the driving condition of the gate driving circuit is set to forward, carry clocks CRCLK1 to CRCLK3 and scan clocks SCLK1 to SCLK12 may be generated sequentially in the forward direction. For example, the carry clocks CRCLK1 to CRCLK3 may be generated in the order of a first carry clock CRCLK1, a second carry clock CRCLK2, and a third carry clock CRCLK3. Also, the scan clocks SCLK1 to SCLK12 may be generated in the order of a first scan clock SCLK1, a second scan clock SCLK2, . . . , and a twelfth scan clock SCLK12.

The carry clocks CRCLK1 to CRCLK3 may be generated to each have an on pulse width of at least two horizontal period 2H. In this case, the carry clocks CRCLK1 to CRCLK3 may be generated so that on pulse width generating times do not overlap per off pulse width of at least two horizontal period 2H. For example, an off pulse separation time of at least two horizontal period 2H may be between an on pulse of the first carry clock CRCLK1 and the second carry clock CRCLK2.

The scan clocks SCLK1 to SCLK12 may be generated to each have an on pulse width of at least two horizontal periods 2H. In this case, the scan clocks SCLK1 to SCLK12 may be generated so that on pulse width generating times sequentially overlap per one horizontal period which is half of two horizontal period 2H. For example, an on pulse overlap time of at least one horizontal time may be between an on pulse of the first scan clock SCLK1 and the second scan clock SCLK2.

As in FIGS. 14 and 16, a first touch frame 1_T-Frame may be a period where image data are written in all pixels and an image is displayed. The gate driving circuit may be set to the forward condition and may output a display scan signal (for example, D-SCAN of FIG. 9) so that image data are written in all pixels P of the display panel during the first display frame 1_D-Frame, based on the carry clocks CRCLK1 to CRCLK3 and the scan clocks SCLK1 to SCLK12.

As in FIGS. 14 and 17, a first display frame 1_D-Frame may be a period where touch sensing driving is performed on only representative pixels of the display panel. The gate driving circuit may be set to the forward condition and may output a touch scan signal (for example, T-SCAN of FIG. 9) so that a touch input is sensed from the representative pixels of the display panel during the first touch frame 1_T-Frame, based on the carry clocks CRCLK1 to CRCLK3 and the scan clocks SCLK1 to SCLK12.

Moreover, in FIG. 17, an example is illustrated where the carry clocks CRCLK1 to CRCLK3 have an on pulse width of one horizontal period 1H so as to transfer a carry signal C and have an on pulse width of four horizontal period 4H so as to execute a touch sensing time T, but an embodiment is not limited thereto. Also, in FIG. 17, an example is illustrated where touch sensing is performed based on a first scan clock SCLK1, a fifth scan clock SCLK5, and a ninth scan clock SCLK9, but an embodiment is not limited thereto.

Figure 18:
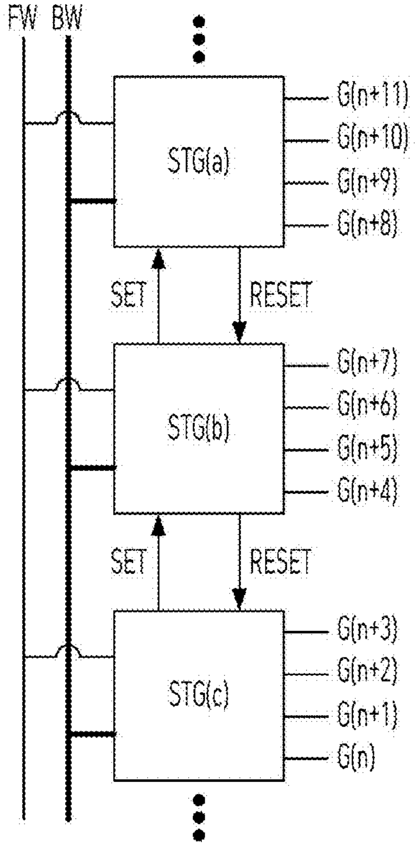
FIG. 18 is a block diagram for describing a signal relationship transferred and received between stages when a driving condition of a gate driving circuit is set to reverse.
Figure 19:
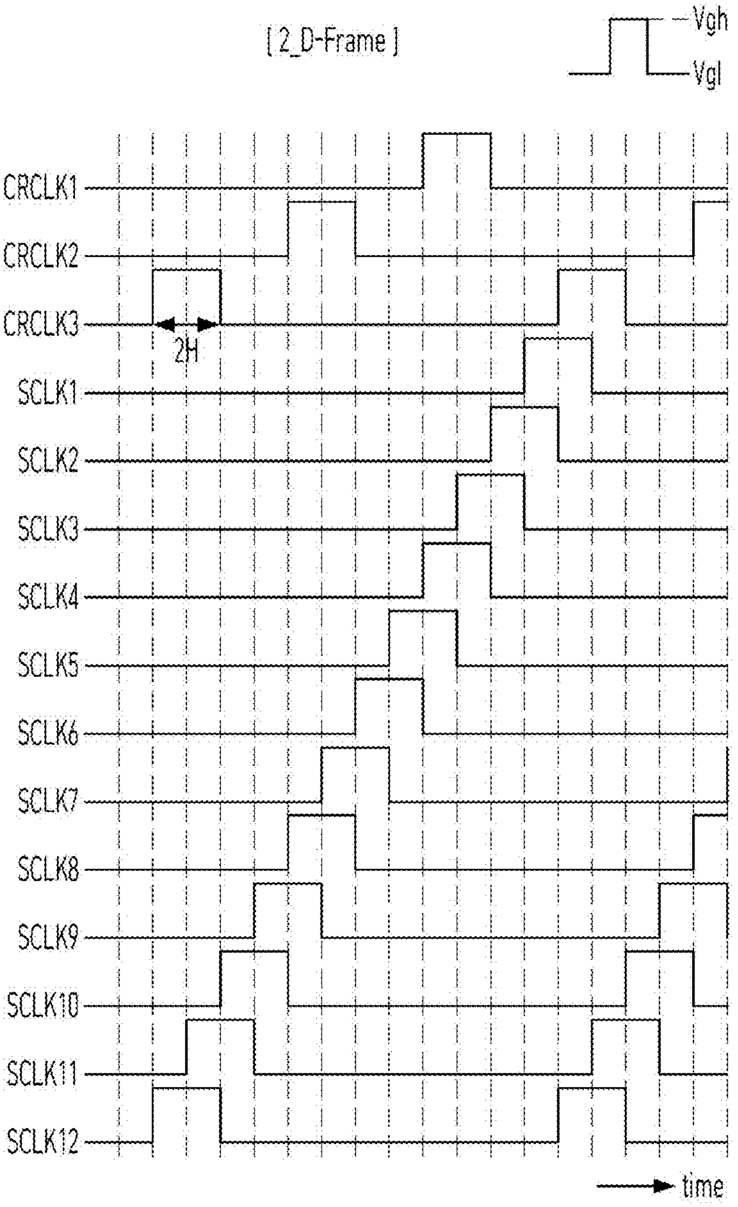
FIG. 19 is a waveform diagram showing carry clocks and scan clocks applied to a gate driving circuit during a second display frame under the condition of FIG. 18.
Figure 20:
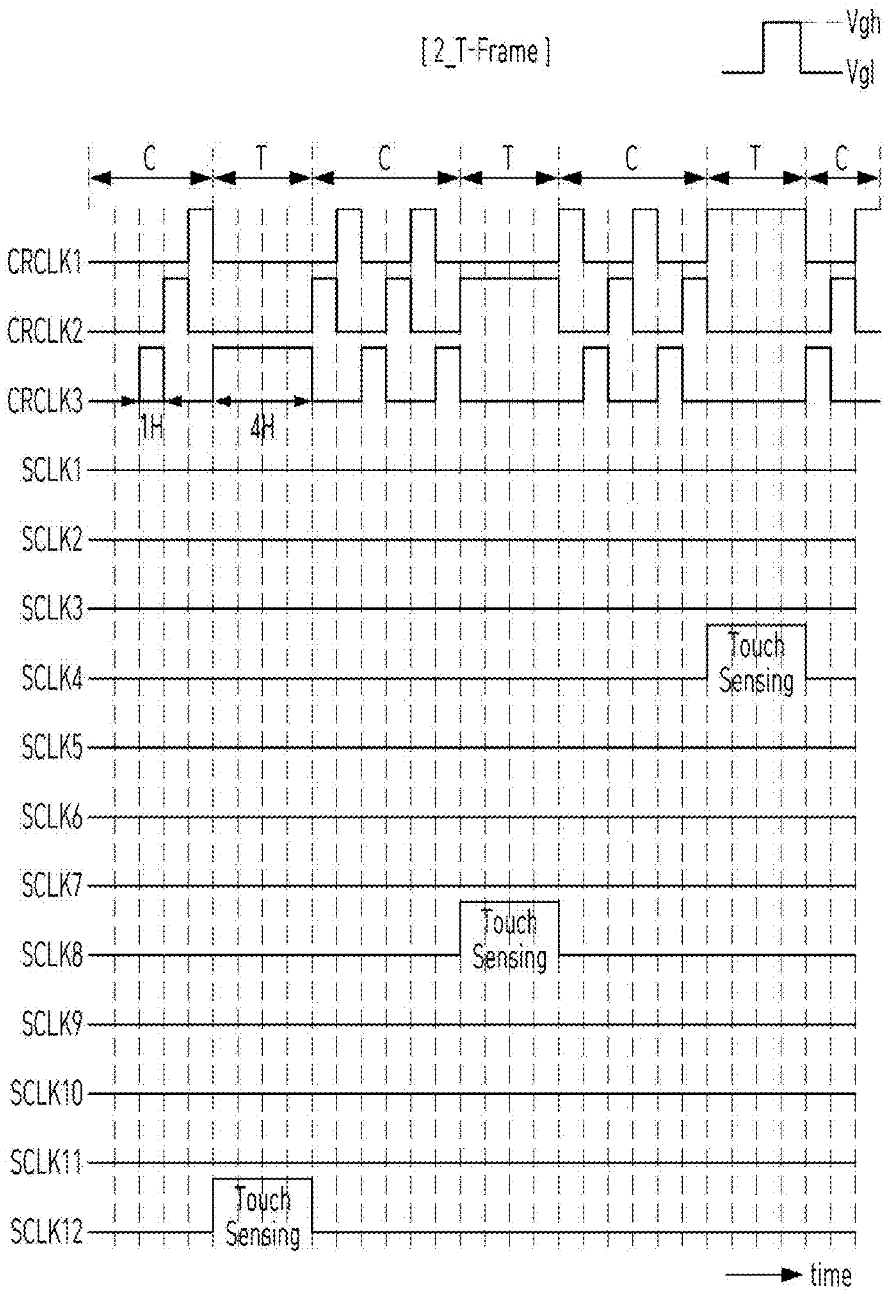
FIG. 20 is a waveform diagram showing carry clocks and scan clocks applied to the gate driving circuit during a second touch frame under the condition of FIG. 18.

FIG. 18 is a block diagram for describing a signal relationship transferred and received between stages when a driving condition of a gate driving circuit is set to reverse, FIG. 19 is a waveform diagram showing carry clocks and scan clocks applied to a gate driving circuit during a second display frame under the condition of FIG. 18, and FIG. 20 is a waveform diagram showing carry clocks and scan clocks applied to the gate driving circuit during a second touch frame under the condition of FIG. 18.

As illustrated in FIG. 18, when a driving condition of the gate driving circuit is set to reverse, a forward voltage having a low voltage level (or a ground voltage level) may be applied to a forward voltage line FW connected to stages STG(a) to STG(c). On the other hand, a reverse voltage having a high voltage level may be applied to a reverse voltage line BW connected to the stages STG(a) to STG(c).

When the driving condition of the gate driving circuit is set to reverse, a set signal SET may be transferred (reverse direction) from a $C^{th}$ stage STG(c) to a $B^{th}$ stage STG(b) and from the $B^{th}$ stage STG(b) to an $A^{th}$ stage STG(a). On the other hand, a reset signal RESET may be transferred (forward direction) from the $A^{th}$ stage STG(a) to the $B^{th}$ stage STG(b) and from the $B^{th}$ stage STG(b) to the $C^{th}$ stage STG(c).

As illustrated in FIG. 19, when the driving condition of the gate driving circuit is set to reverse, carry clocks CRCLK1 to CRCLK3 and scan clocks SCLK1 to SCLK12 may be generated sequentially in the reverse direction. For example, the carry clocks CRCLK1 to CRCLK3 may be generated in the order of a third carry clock CRCLK3, a second carry clock CRCLK2, and a first carry clock CRCLK1. Also, the scan clocks SCLK1 to SCLK12 may be generated in the order of a twelfth scan clock SCLK12, an eleventh scan clock SCLK11, . . . , and a first scan clock SCLK1.

A generating condition of the carry clocks CRCLK1 to CRCLK3 and the scan clocks SCLK1 to SCLK12 may be as described above with reference to FIGS. 16 and 17, but only a generating order may be changed from the forward direction to the reverse direction.

As in FIGS. 14 and 19, a second display frame 2_D-Frame may be a period where image data are written in all pixels and an image is displayed. The gate driving circuit may be set to the reverse condition and may output a display scan signal (for example, D-SCAN of FIG. 9) so that image data are written in all pixels P of the display panel during the second display frame 2_D-Frame, based on the carry clocks CRCLK1 to CRCLK3 and the scan clocks SCLK1 to SCLK12.

As in FIGS. 14 and 20, a second touch frame 2_T-Frame may be a period where touch sensing driving is performed on only representative pixels of the display panel. The gate driving circuit may be set to the reverse condition and may output a touch scan signal (for example, T-SCAN of FIG. 9) so that a touch input is sensed from the representative pixels of the display panel during the second touch frame 2_T-Frame, based on the carry clocks CRCLK1 to CRCLK3 and the scan clocks SCLK1 to SCLK12.

Moreover, in FIG. 20, an example is illustrated where the carry clocks CRCLK1 to CRCLK3 have an on pulse width of one horizontal period 1H so as to transfer a carry signal C and have an on pulse width of four horizontal period 4H so as to execute a touch sensing time T, but an embodiment is not limited thereto. Also, in FIG. 20, an example is illustrated where touch sensing is performed based on a fourth scan clock SCLK4, an eighth scan clock SCLK8, and a twelfth scan clock SCLK12, but an embodiment is not limited thereto.

Furthermore, in FIGS. 16, 17, 19, and 20, an example is illustrated where the carry clocks CRCLK1 to CRCLK3 and the scan clocks SCLK1 to SCLK12 are generated at a level between a gate high voltage Vgh and a gate low voltage Vgl, but an embodiment is not limited thereto.

Figure 21:
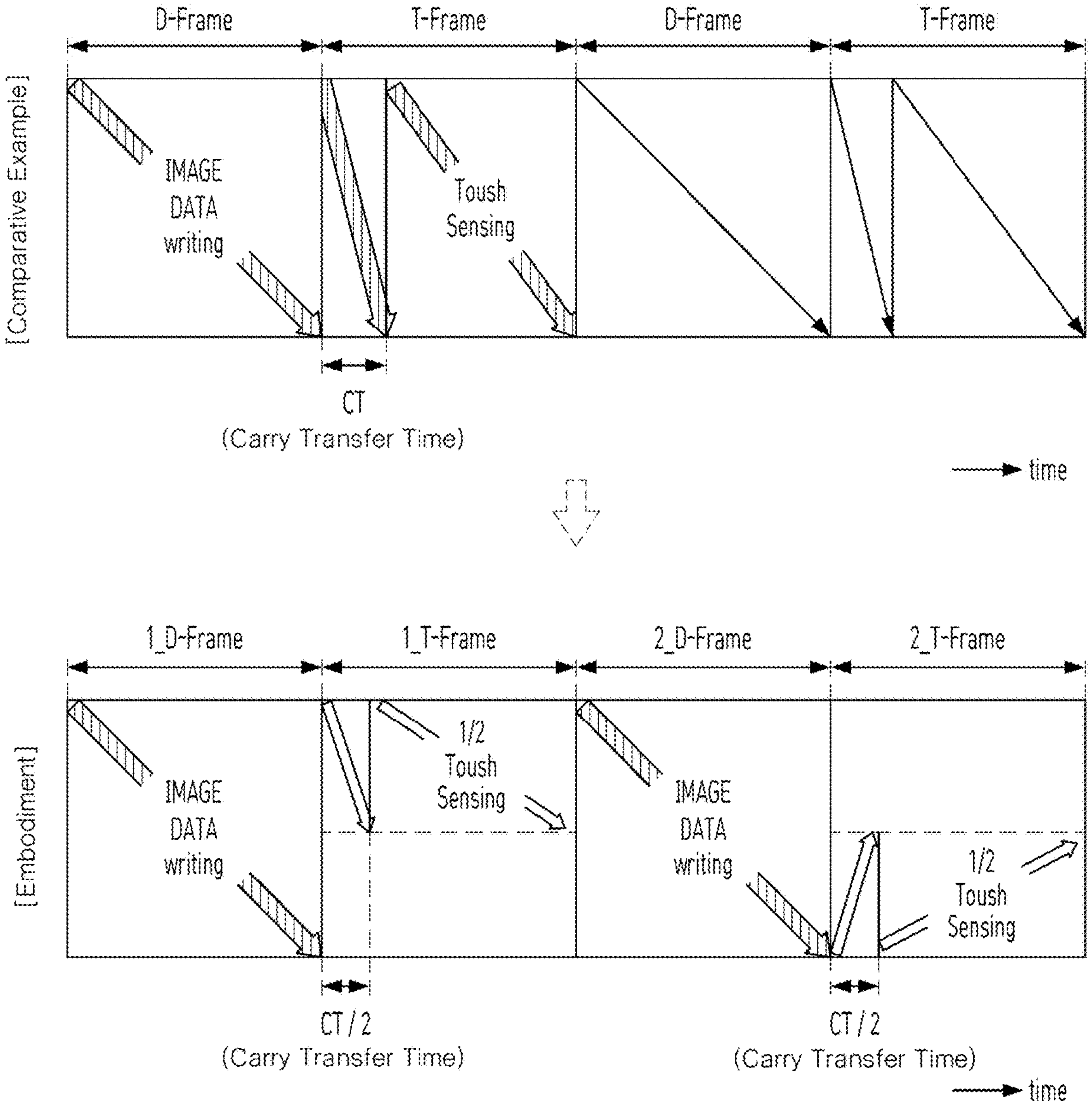
FIG. 21 is a diagram for describing a difference between a touch scan method of a comparative example and a touch scan method of an embodiment.

FIG. 21 is a diagram for describing a difference between a touch scan method of a comparative example and a touch scan method of an embodiment.

The comparative example of FIG. 21 may be a method which starts an operation from a first stage circuit where a first gate line of a display panel is disposed, outputs a carry signal, and sequentially transfers the carry signal up to a $k^{th}$ stage circuit where a last gate line is disposed, during a touch frame T-Frame.

Comparing the comparative example of FIG. 21 with an embodiment, an embodiment may decrease a carry signal transfer time CT by about half (CT/2) compared to the comparative example. The reason may be because an embodiment drives a gate driving circuit so that a touch frame is divided into a first touch frame 1_T-Frame and a second touch frame 2_T-Frame, and a carry signal is divided by ½ and is transferred from an upper region to a center region or from a lower region to the center region during two divided frames.

In an embodiment, although a touch frame is divided into two touch frames, because the carry signal transfer time CT decreases by about half (CT/2), a time may be more sufficient than the comparative example, and thus, sensitivity based on a touch sensing operation may be enhanced. Also, touch data may be obtained, and moreover, a time for analyzing coordinates of a touch input position may be secured.

Hereinabove, the present disclosure may decrease a carry signal transfer time to secure a touch sensing time, and based thereon, may enhance sensitivity based on a touch sensing operation. Also, the present disclosure may increase an obtainment target (a touch screen block) of touch data and may secure a time for analyzing coordinates of a touch input position.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure including the following claims.

The various embodiments described above can be combined to provide further embodiments. Aspects of the embodiments can be modified, if necessary to employ concepts of the various embodiments to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch sensing display device comprising:

a display panel configured to alternately perform display driving or touch sensing driving; and a gate driving circuit including stage circuits for driving gate lines of the display panel, wherein the gate driving circuit is configured to output a display scan signal generated based on a display carry clock to the display panel during a display frame corresponding to a display driving period and output a touch scan signal generated based on a touch carry clock to the display panel during a touch frame corresponding to a touch sensing driving period, and a position at which the touch carry clock is generated during a first touch sensing frame included in the touch sensing driving period differs from a position at which the touch carry clock is generated during a second touch sensing frame included in the touch sensing driving period, wherein the touch carry clock is generated from a first gate line of the display panel during the first touch sensing frame, and is generated from a last gate line of the display panel during the second touch sensing frame.

2. The touch sensing display device of claim 1, wherein the touch carry clock is configured to move in a forward direction with respect to the display panel during the first touch sensing frame and move in a reverse direction with respect to the display panel during the second touch sensing frame.

3. The touch sensing display device of claim 2, wherein the gate driving circuit is configured to apply a forward voltage for driving the stage circuits in the forward direction during the first touch sensing frame and apply a reverse voltage for driving the stage circuits in the reverse direction during the second touch sensing frame.

4. The touch sensing display device of claim 1, wherein the touch carry clock is generated from the first gate line of the display panel and moves up to a gate line disposed in a center region of the display panel during the first touch sensing frame, and during the second touch sensing frame, the touch carry clock is generated from the last gate line of the display panel and move down to the gate line disposed in the center region of the display panel.

5. The touch sensing display device of claim 3, wherein, during the touch sensing driving period, a first stage of the stage circuits supplies a first touch scan signal to one first gate line included in a first touch screen block of the display panel, and a second stage of the stage circuits supplies a second touch scan signal to one second gate line included in a second touch screen block of the display panel.

6. The touch sensing display device of claim 1, further comprising a sensing circuit configured to sense a voltage of a source node of a representative pixel formed in a substrate of the display panel according to the touch scan signal, so as to sense a touch input applied to the display panel during the touch sensing driving period.

7. The touch sensing display device of claim 6, wherein the representative pixel comprises a driving transistor including a source electrode connected to the source node and a gate electrode connected to a gate node, the gate node comprises a first conductive pattern which faces the source node with at least one insulation layer therebetween and is a first electrode of a storage capacitor and a second conductive pattern connected to the first conductive pattern through a contact hole passing through the at least one insulation layer, the source node comprises a third conductive pattern which is disposed on the at least one insulation layer and is a second electrode of the storage capacitor, and the first conductive pattern is disposed closer to the substrate than the second conductive pattern and the third conductive pattern.

8. The touch sensing display device of claim 1, wherein a number of the stage circuits is a quarter of a number of the gate lines.

9. A driving method of a touch sensing display device including a display panel alternately performing display driving and touch sensing driving and a gate driving circuit including stage circuits for driving gate lines of the display panel, the driving method comprising:

outputting a display scan signal generated based on a display carry clock to the display panel during a display frame defining a display driving period; and outputting a touch scan signal generated based on a touch carry clock to the display panel during a touch frame defining a touch sensing driving period, wherein a position at which the touch carry clock is generated during a first touch sensing frame included in the touch sensing driving period differs from a position at which the touch carry clock is generated during a second touch sensing frame included in the touch sensing driving period, wherein the touch carry clock is generated from a first gate line of the display panel during the first touch sensing frame, and is generated from a last gate line of the display panel during the second touch sensing frame.

10. The driving method of claim 9, wherein the touch carry clock moves in a forward direction with respect to the display panel during the first touch sensing frame and moves in a reverse direction with respect to the display panel during the second touch sensing frame.

11. The driving method of claim 9, wherein the touch carry clock is generated from the first gate line of the display panel and moves up to a gate line disposed in a center region of the display panel during the first touch sensing frame, and during the second touch sensing frame, the touch carry clock is generated from the last gate line of the display panel and moves down to the gate line disposed in the center region of the display panel.

12. The driving method of claim 9, wherein, during the touch sensing driving period, a first stage of the stage circuits supplies a first touch scan signal to one first gate line included in a first touch screen block of the display panel, and a second stage of the stage circuits supplies a second touch scan signal to one second gate line included in a second touch screen block of the display panel.

13. The driving method of claim 9, wherein, during the touch sensing driving period, sensing a voltage of a source node of a representative pixel formed in a substrate of the display panel according to the touch scan signal, so as to sense a touch input applied to the display panel.

14. The driving method of claim 9, wherein a number of the stage circuits is a quarter of a number of the gate lines.

15. A touch sensing display device comprising:

a display panel configured to alternately perform display driving or touch sensing driving; and a gate driving circuit including stage circuits for driving gate lines of the display panel, wherein the gate driving circuit is configured to output a display scan signal generated based on a display carry clock to the display panel during a display frame corresponding to a display driving period and output a touch scan signal generated based on a touch carry clock to the display panel during a touch frame corresponding to a touch sensing driving period, and wherein the touch carry clock is configured to move in a forward direction with respect to the display panel during a first touch sensing frame included in the touch sensing driving period and move in a reverse direction with respect to the display panel during a second touch sensing frame included in the touch sensing driving period.

16. The touch sensing display device of claim 15, wherein the gate driving circuit is configured to apply a forward voltage for driving the stage circuits in the forward direction during the first touch sensing frame and apply a reverse voltage for driving the stage circuits in the reverse direction during the second touch sensing frame.

17. The touch sensing display device of claim 15, wherein the touch carry clock is generated from a first gate line of the display panel and moves up to a gate line disposed in a center region of the display panel during the first touch sensing frame, and during the second touch sensing frame, the touch carry clock is generated from a last gate line of the display panel and move down to the gate line disposed in the center region of the display panel.

18. The touch sensing display device of claim 16, wherein, during the touch sensing driving period, a first stage of the stage circuits supplies a first touch scan signal to one first gate line included in a first touch screen block of the display panel, and a second stage of the stage circuits supplies a second touch scan signal to one second gate line included in a second touch screen block of the display panel.

19. The touch sensing display device of claim 15, further comprising a sensing circuit configured to sense a voltage of a source node of a representative pixel formed in a substrate of the display panel according to the touch scan signal, so as to sense a touch input applied to the display panel during the touch sensing driving period.

20. The touch sensing display device of claim 19, wherein the representative pixel comprises a driving transistor including a source electrode connected to the source node and a gate electrode connected to a gate node, the gate node comprises a first conductive pattern which faces the source node with at least one insulation layer therebetween and is a first electrode of a storage capacitor and a second conductive pattern connected to the first conductive pattern through a contact hole passing through the at least one insulation layer, the source node comprises a third conductive pattern which is disposed on the at least one insulation layer and is a second electrode of the storage capacitor, and the first conductive pattern is disposed closer to the substrate than the second conductive pattern and the third conductive pattern.

* * * * *